US006532316B1

(12) United States Patent
Cao

(10) Patent No.: US 6,532,316 B1
(45) Date of Patent: Mar. 11, 2003

(54) BI-DIRECTIONAL POLARIZATION-INDEPENDENT OPTICAL ISOLATOR

(75) Inventor: Simon Cao, San Mateo, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/438,043

(22) Filed: Nov. 10, 1999

(51) Int. Cl.[7] .............................. G02B 6/00; G02B 5/30; G02F 1/09

(52) U.S. Cl. .......................... 385/11; 385/18; 359/281; 359/282; 359/484; 359/494; 359/495

(58) Field of Search ................... 359/281, 282, 359/484, 487, 494–495; 372/703; 385/11, 18, 39

(56) References Cited

U.S. PATENT DOCUMENTS

| 4,548,478 A | | 10/1985 | Shirasaki | |
|---|---|---|---|---|
| 4,712,880 A | | 12/1987 | Shirasaki | |
| 5,033,830 A | | 7/1991 | Jameson | |
| 5,499,132 A | | 3/1996 | Tojo et al. | |
| 5,606,439 A | * | 2/1997 | Wu | 349/117 |
| 5,689,360 A | * | 11/1997 | Kurata et al. | 359/281 |
| 5,768,005 A | * | 6/1998 | Cheng et al. | 359/281 |
| 5,768,015 A | * | 6/1998 | Pattie | 359/484 |
| 5,912,766 A | * | 6/1999 | Pattie | 359/484 |
| 6,088,153 A | * | 7/2000 | Anthon et al. | 359/341 |
| 6,169,604 B1 | | 1/2001 | Cao | 356/519 |

FOREIGN PATENT DOCUMENTS

EP        0 123 456 A2        3/1984

OTHER PUBLICATIONS

Lee et al., Bidirectional wavelength–selective optical isolator, Jul. 5, 2001, Electronics Letters, vol. 37, No. 14, pp. 910–912.*
International Search Report; dated Mar. 1, 2001 for International Application No. PCT/US00/30916 (which corresponds to the above–mentioned U.S. Application No. 09/438,043).
Tanaka et al., Holographically formed liquid–crystal/polymer device for relective color display, Journal of the Society for Information Display, Feb. 1994, vol. 2, No. 1, pp. 37–40.

(List continued on next page.)

Primary Examiner—Hemang Sanghavi
Assistant Examiner—Omar Rojas, Jr.
(74) Attorney, Agent, or Firm—Staas & Halsey LLP

(57) ABSTRACT

A bi-directional polarization independent optical isolator simultaneously transmits two separate signal rays in opposite forward directions and simultaneously suppresses backward transmission of each signal ray in its respective reverse direction. The separate signal rays may comprise either two wavelength bands completely separated by wavelength or two sets of wavelengths, such that wavelengths of the two signal rays are interspersed in alternating fashion. The bi-directional polarization independent optical isolator includes a birefringent polarization separation/combining element, a reciprocal optical rotation element, a lens, a reflective element, and a reciprocal optical rotation element. The reflective element comprises either a mirror/waveplate assembly or a non-linear interferometer. Four fibers or optical ports are optically coupled to the isolator and may be configured such that either single-stage bi-directional isolation is accomplished for each of two fiber transmission lines or double stage bi-directional isolation is accomplished on a single fiber transmission line.

38 Claims, 23 Drawing Sheets

OTHER PUBLICATIONS

International Search Report; dated Apr. 4, 2001 for International Application No. PCT/US00/30917 (which corresponds to co-pending U.S. Application No. 09/437,791).

U.S. application No. 09/437,791, Cao., filed Nov. 10, 1999.

U.S. application No. 09/388,350, Cao et al., filed Sep. 1, 1999.

Kreifeldt, E., Avanex Emerges with Photonic Process Technology, http://news.fiberopticsonline.com/news–analysis/19990429–1759.html, pp. 1–6, Apr. 29, 1999.

PCT Notification of Transmittal of International Preliminary Examination Report, undated but date–stamped as received Aug. 26, 2002, including PCT International Preliminary Examination Report in International Application No. PCT/US00/30917 (corresponding to co–pending U.S. Patent Application No. 09/437,791).

* cited by examiner

BI-DIRECTIONAL POLARIZATION-INDEPENDENT OPTICAL ISOLATOR

CROSS-REFERENCE TO RELATED APPLICATIONS

This application is related to U.S. patent application entitled Reflection-Type Polarization-Independent Optical Isolator, Optical Isolator/Amplifier/Monitor, and Optical System, by Simon Cao, U.S. Ser. No. 09/437,791, filed concurrently herewith and incorporated herein by reference.

This application is also related to U.S. patent application entitled Nonlinear Interferometer for Fiber Optic Dense Wavelength Division Multiplexer Utilizing a Phase Differential Method of Wavelength Separation, by Simon Cao, filed on Feb. 10, 1999, U.S. Ser. No. 09/247,253, now U.S. Pat. No. 6,169,604, incorporated herein by reference.

This application is further related to U.S. patent application entitled Dense Wavelength Division Multiplexer Utilizing an Asymmetric Pass Band Interferometer, by Simon X. F. Cao and Xiaoping Mao, filed Sep. 1, 1999, U.S. Ser. No. 09/388,350, now U.S. Pat. No. 6,310,690, which is incorporated herein by reference.

BACKGROUND OF THE INVENTION

1. Field of the Invention

The present invention relates to a polarization independent optical isolator and particularly to a bi-directional polarization independent isolator simultaneously and independently providing isolation to separate light-wave data channels propagating in opposite directions through an optical fiber.

2. Description of the Related Art

The use of optical fiber in long-distance transmission of voice and/or data is now common. As the demand for data carrying capacity in the transmission of voice and/or data continues to increase, there is a continuing need to augment the amount of actual fiber-optic cable being used as well as to utilize the bandwidth of existing fiber-optic cable more efficiently. The latter practice of increasing the carrying capacity of existing fiber cable is sometimes referred to as the creation of "virtual fiber" and is clearly more cost effective than adding real fiber.

One of the ways in which "virtual" fiber is created is through the practice of Wavelength Division Multiplexing (WDM) in which multiple information channels are independently transmitted over the same fiber using multiple wavelengths of light. In this practice, each light-wave-propagated information channel corresponds to light within a specific wavelength range or "band." To increase data carrying capacity in a given direction, the number of such channels or bands must be increased.

Additionally, it is desirable to use existing fiber for bi-directional communications. Through the use of WDM, a single optical fiber may be used to transmit, both simultaneously and independently, both eastbound (northbound) as well as westbound (southbound) data. This bi-directional data-carrying capability of optical fiber further increases the need for additional channels. However, since all of the channels (wavelength bands) must reside within specific low-loss wavelength regions determined by the properties of existing optical fiber, increased channel capacity requires increased channel density. Thus, as the need for increased data carrying capacity escalates, the demands on WDM optical components—to transmit increasing numbers of more closely spaced channels with no interference or "crosstalk" between them and over long distances—becomes more severe.

Optical amplifiers are important components of fiber-optic communication systems. Traditionally, signal regeneration has been accomplished through the use of repeaters, which are combinations of demultiplexers, receivers, signal recovery electronics, transmitters (light sources together with optical modulators), and multiplexers. In a repeater, the signal for each channel is recovered electronically and transmitted anew. Unfortunately, the complexity and cost of repeater-based systems becomes unwieldy with the increase in the number of channels of WDM systems.

Optical amplifier systems have therefore become attractive alternatives to repeaters. Erbium-doped fiber amplifier (EDFA) systems have become especially popular owing to their gain characteristics near the 1.5 $\mu$m transmission band.

Because of the indiscriminate and non-directional nature of optical fluorescence amplification, unless special precautions are taken, all signals will be amplified on transit through an EDFA and re-transmitted in both directions. These signals may include spurious signals caused by stray reflections or light scattering off of various optical components and propagating counter to the desired signal transmission direction.

To guard against amplification and subsequent transmission of such unwanted signals, optical amplifier systems generally include optical isolators on both sides of the optical gain element (the Er-doped fiber). As shown in the amplifier 100 of the prior art in FIG. 1, optical isolators, such as isolator 101 and isolator 102, are disposed to either side of an Er-doped fiber 103, and comprise part of a set of so-called "optical passive components" which are generally associated with optical amplifier systems. Other such optical passive components illustrated in FIG. 1 are Wavelength Division Multiplexers (WDM's) 104 and 105 and bandpass filter 106. Also included in the amplifier 100 of the prior art shown in FIG. 1 are Co-Pump Laser 108 of 980 nm or 1480 nm and Counter-Pump Laser 110 of 980 nm or 1480 nm.

Optical isolators act as "one-way gates" which only permit signal transmission in the desired direction. This property, although essential, creates a problem for communications systems in which signals are carried in both directions within individual optical fibers, viz. the isolators would block one set of signals.

Therefore, in the current state of the art, separate amplifiers are used for eastbound (northbound) and westbound (southbound) communications channels as shown in the band bi-directional amplifier 200 of the prior art of FIG. 2. In the band bi-directional amplifier 200, the counter-propagating signals are respectively separated and re-combined on either side of the pair of optical amplifiers 206 and 207.

For instance, in FIG. 2, if the "blue" or relatively short wavelength band 201 shown as solid lines represents westward propagating signals and the "red" or relatively long wavelength band 202 shown as dash-dot lines represents eastward propagating signals, then these two signals are separated and recombined by WDMs or circulators 203A and 203B. Between the two WDMs or circulators 203A and 203B, the blue and red signals propagate on separate physical optical fiber sub-paths 204 and 205, respectively, but to either side of each WDM, the westbound blue and eastbound red signals co-propagate along the same physical fiber pathways 211 and 212. Each of the fiber sub-paths 204 and 205 contains its own amplifier system, 206 and 207, respectively. Optional second amplifiers 208 and 209 may be placed in each of the fiber sub-paths and the locations between each of the resulting sequential amplifiers 206 and 208 or 207 and 209 corresponds to multi-access ports 210A and 210B in the blue and red sub-paths, respectively. Generally, each of the optical amplifier systems, 206 and 207 and, optionally, 208 and 209, shown in FIG. 2, comprises all of the optical passive and active components illustrated in FIG. 1 and possibly others. In particular, the amplifier 206 (and optionally 208) contains optical isolators that only permit westbound light propagation and the amplifier 207 (and optionally 209) contains optical isolators that only permit eastbound light propagation.

One example of the possible wavelength constitution of co-propagating bi-directional signals is illustrated in FIG. 3, showing the relative positions between light traveling in a "red" band and light traveling in a "blue" band through a band bi-directional polarization independent isolator. For the example shown in FIG. 3, the terms "red" band and "blue" band are meant as relative terms referring to light of a relatively longer wavelength (the "red" band) and light of a relatively shorter wavelength (the "blue" band) and may not correspond to actual colors of red or blue produced by that light.

Referring now to FIG. 3, as an example, the "blue" band 301 and the "red" band 302 occupy separate wavelength regions each wholly contained within the well-known fiber transmission band 303 centered near a wavelength of 1.55 $\mu$m. For instance band 301 might represent the wavelength constitution of the westbound signal channel(s) 201 of FIG. 2 while band 302 might represent the wavelength constitution of the eastbound signal channel(s) 202. This type of bi-directional lightwave transmission scheme is termed "band bi-directional" transmission herein. Other types of band bi-directional transmission schemes are possible. For instance, the "blue" band might correspond to all or a portion of the 1.3 $\mu$m fiber transmission band while the "red" band might correspond to all or a portion of the 1.55 $\mu$m transmission band, etc.

Generally, there can be more than one channel per band, in that a channel is one particular signal, one particular conversation, or one particular computer sending data. A band is a collection of channels and is one wavelength range, and could be one channel or a collection of channels. Ideally, a channel travels in one wavelength. Because of its relatively low loss per meter, the 1.55 micrometer band of light is suitable for relatively longer haul telecommunications. The 1.3 micrometer band of light is suitable for relatively short haul telecommunications (20 kilometers, 30 kilometers, etc.).

Optical amplifiers are costly and complex components of optical data and telecommunications systems. The prior-art bi-directional optical amplification system shown in FIG. 2 uses two such amplifiers, effectively doubling the cost, complexity, and bulk relative to unidirectional transmission systems. This doubling of systems is necessitated by optical isolators, which are integral passive components of optical amplifiers, generally performing isolation in a unidirectional sense, regardless of the wavelength of light propagated through them.

Because nothing in the operation of prior-art polarization independent optical isolators as described with respect to FIGS. 1–3 changes its fundamental character with changing wavelength, such isolators generally perform their "one-way gate" function regardless of the wavelength of light which is input to them. Thus, in order to realize the function of a bi-directional optical amplifier as discussed above, the eastbound and westbound signals must be bifurcated and two optical amplifiers must be used as in FIG. 2, with each of the two optical amplifiers associated with its own set of unidirectional optical isolators as in FIG. 1. Clearly, the development of a bi-directional optical isolator, having the property that the direction in which isolation occurs depends upon wavelength, would obviate the need for two amplifiers in bi-directional photonic systems and would facilitate the development of a bi-directional amplifier. Such a development would have the advantage of reduced cost, bulk and complexity as compared with existing bi-directional optical amplification systems and would have the additional advantage of facilitating the incorporation of bi-directional amplification into existing fiber-optic cable.

SUMMARY OF THE INVENTION

Accordingly, it is an object of the present invention to solve the above-mentioned problems of the related art and to create such advantages, as described above.

Another object of the present invention is to provide a bi-directional optical isolator suitable for use in bi-directional amplifiers.

A further object of the present invention is to provide a band bi-directional polarization-independent optical isolator.

Also, an object of the present invention is to provide an interleaved bi-directional polarization-independent optical isolator.

Still a further object of the present invention is to provide a double-stage band bi-directional polarization-independent optical isolator.

An additional object of the present invention is to provide a double-stage interleaved bi-directional polarization-independent optical isolator.

To accomplish the above-mentioned objects, the present invention is an apparatus comprising a bi-directional polarization-independent isolator transmitting therethrough input light including first wavelengths received from a first fiber to a second fiber while preventing transmission therethrough of input light of the first wavelengths received from the second fiber to the first fiber. The apparatus of the present invention transmits therethrough input light of second wavelengths different than the first wavelengths and received from the second fiber to the first fiber while preventing transmission therethrough of input light of the second wavelengths received from the first fiber to the second fiber. The bi-directional polarization-independent isolator of the present invention divides the input light into components, and recombines the components into output light transmitted to one of the first fiber and the second fiber and based upon whether the components are changed in character by the bi-directional polarization-independent isolator.

Also to accomplish the foregoing objects, the present invention is a band bi-directional polarization-independent optical isolator receiving from a first fiber input light having first wavelengths and input light having second wavelengths different than the first wavelengths, and receiving from a second fiber input light having the first wavelengths and input light having the second wavelengths. The band bi-directional polarization-independent optical isolator of the present invention comprises a bi-directional polarization independent optical element, a reflector comprising a mirror/waveplate assembly, and a lens. The bi-directional polarization independent element divides the input light into components and selectively recombines the components into output light transmitted to one of the first fiber and the second fiber and based upon the plane of polarization of the components and if a change in character of the components has occurred during transmission through the band bi-directional polarization-independent optical isolator. The mirror/waveplate assembly reflects therefrom the components of the input light incident on the reflector after selectively changing the plane of polarization of the components of the input light incident thereon based upon the wavelength of the components of the input light incident thereon. The lens is positioned equidistantly between the reflector and the bi-directional polarization independent optical element and collimates the components of the input light onto the reflector and focuses the reflected components of the input light onto the bi-directional polarization independent optical element.

In addition, to accomplish the foregoing objects, the present invention is an interleaved bi-directional polarization-independent optical isolator receiving from a first fiber input light having first wavelengths and input light having second wavelengths different than the first wavelengths, and receiving from a second fiber input light having the first wavelengths and input light having the second wavelengths. The interleaved bi-directional polarization-independent optical isolator of the present invention comprises a bi-directional polarization independent optical element, a reflector comprising a non-linear interferometer, and a lens. The bi-directional polarization independent optical element divides the input light into components and selectively recombines the components into output light transmitted to one of the first fiber and the second fiber and based upon the plane of polarization of the components and if a change in character of the components has occurred during transmission through the interleaved bi-directional polarization-independent optical isolator. The non-linear interferometer reflects therefrom the components of the input light incident on the reflector after selectively changing the plane of polarization of the components of the input light incident thereon based upon the wavelength of the components of the input light incident thereon. The lens is positioned equidistantly between the reflector and the bi-directional polarization independent optical element, and collimates the components of the input light onto the reflector and focuses the reflected components of the input light onto the bi-directional polarization independent optical element.

In addition, the present invention is a twin band bi-directional polarization-independent optical isolator comprising a four-fiber ferrule and a bi-directional polarization independent optical element, a mirror/waveplate assembly, and a lens.

Further, the present invention is a twin interleaved bi-directional polarization-independent optical isolator comprising a four-fiber ferrule and a bi-directional polarization independent optical element, a non-linear interferometer, and a lens.

In both the twin band bi-directional polarization-independent optical isolator of the present invention and the twin interleaved bi-directional polarization-independent optical isolator of the present invention, the four-fiber ferrule includes a first fiber, a second fiber, a third fiber, and a fourth fiber. The first fiber receives input light having first wavelengths and outputs output light having second wavelengths different than the first wavelengths and output light having the first wavelengths. The second fiber corresponds to the first fiber and receives input light having third wavelengths and outputs output light having fourth wavelengths different than the third wavelengths and output light having the third wavelengths. The third fiber receives input light having the second wavelengths and outputs output light having the first wavelengths and output light having the second wavelengths. The fourth fiber corresponds to the third fiber and receives input light having the fourth wavelengths and outputs output light having the third wavelengths and output light having the fourth wavelengths.

Also, the present invention is a double-stage band bi-directional polarization-independent optical isolator in which input light travels through a band bi-directional polarization-independent optical isolator twice. The double-stage band bi-directional optical isolator includes a four-fiber ferrule including two input fibers and two output fibers. One of the output fibers is coupled to one of the input fibers through a polarization-preserving optical coupling.

Further, the present invention is a double-stage interleaved bi-directional polarization-independent optical isolator in which input light travels through an interleaved bi-directional polarization-independent optical isolator twice. The double-stage interleaved bi-directional optical isolator includes a four-fiber ferrule including two input fibers and two output fibers. One of the output fibers is coupled to one of the input fibers through a polarization-preserving optical coupling.

In addition, the present invention is a method of isolating input light having first wavelengths traveling from a first fiber to a second fiber from input light having the first wavelengths traveling from the second fiber to the first fiber, and isolating input light having second wavelengths traveling from the second fiber to the first fiber from input light having the second wavelengths traveling from the first fiber to the second fiber. The method of the present invention comprises transmitting through a bi-directional polarization-independent isolator the input light including first wavelengths received from the first fiber to the second fiber while preventing transmission therethrough of the input light of the first wavelengths received from the second fiber to the first fiber. The method of the present invention also comprises transmitting therethrough the input light of second wavelengths received from the second fiber to the first fiber while preventing transmission therethrough of the input light of the second wavelengths received from the first fiber to the second fiber, said bi-directional polarization-independent isolator dividing the input light into components, and recombining the components into output light based upon whether the components are changed in character by the bi-directional polarization-independent isolator.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The object and features of the present invention will become more readily apparent from the following detailed description taken in conjunction with the accompanying drawings in which.

DESCRIPTION OF THE PREFERRED EMBODIMENTS

Figure 1:
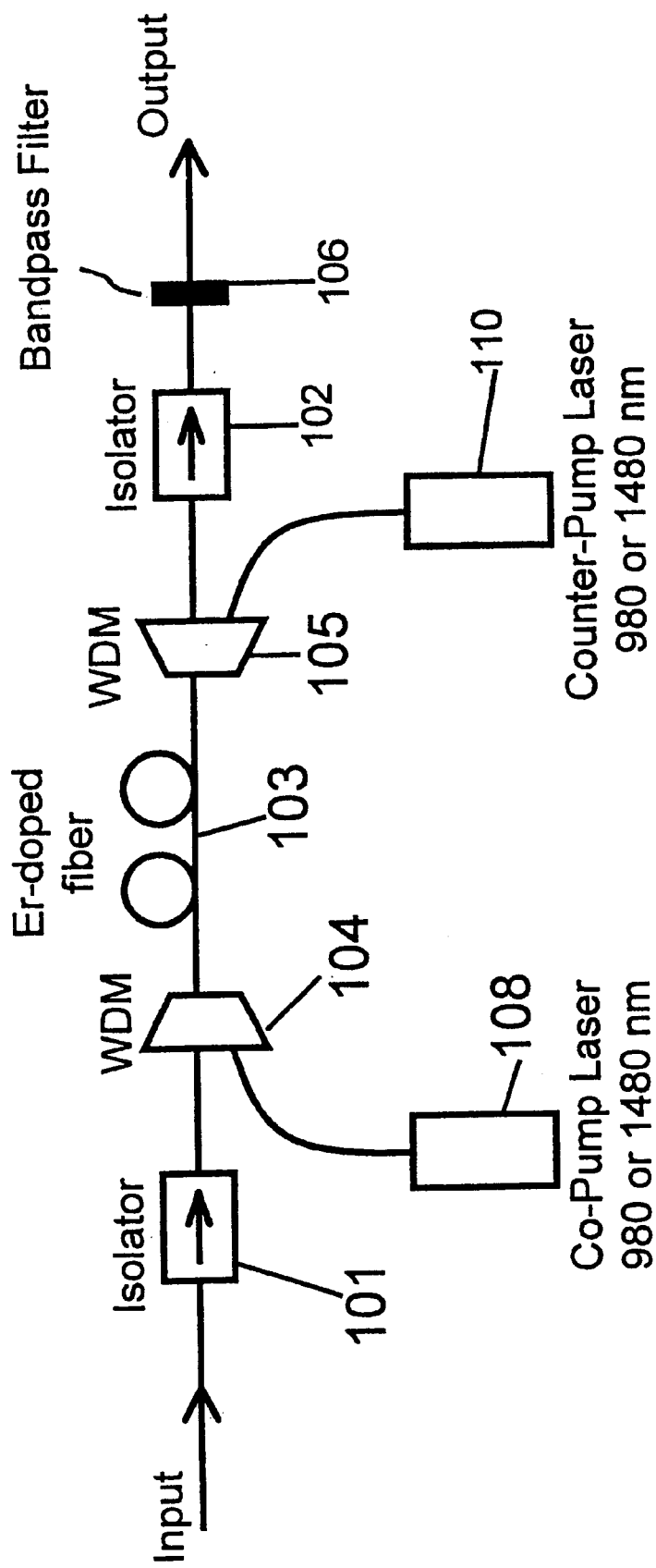
FIG. 1 is a basic block diagram of an optical fiber amplifier showing the assembly of conventional optical passive components.

In the description of the present invention, it is to be noted that like parts are designated by like reference numerals throughout in the accompanying drawings.

Before the present invention is discussed in detail with reference to FIGS. 7–21, a brief discussion of interleaved bi-directional transmission is presented with reference to FIGS. 4A–4C and a brief discussion of an example of the general operation of a polarization independent optical isolator is provided with reference to FIG. 5 and FIG. 6

Figure 4A:
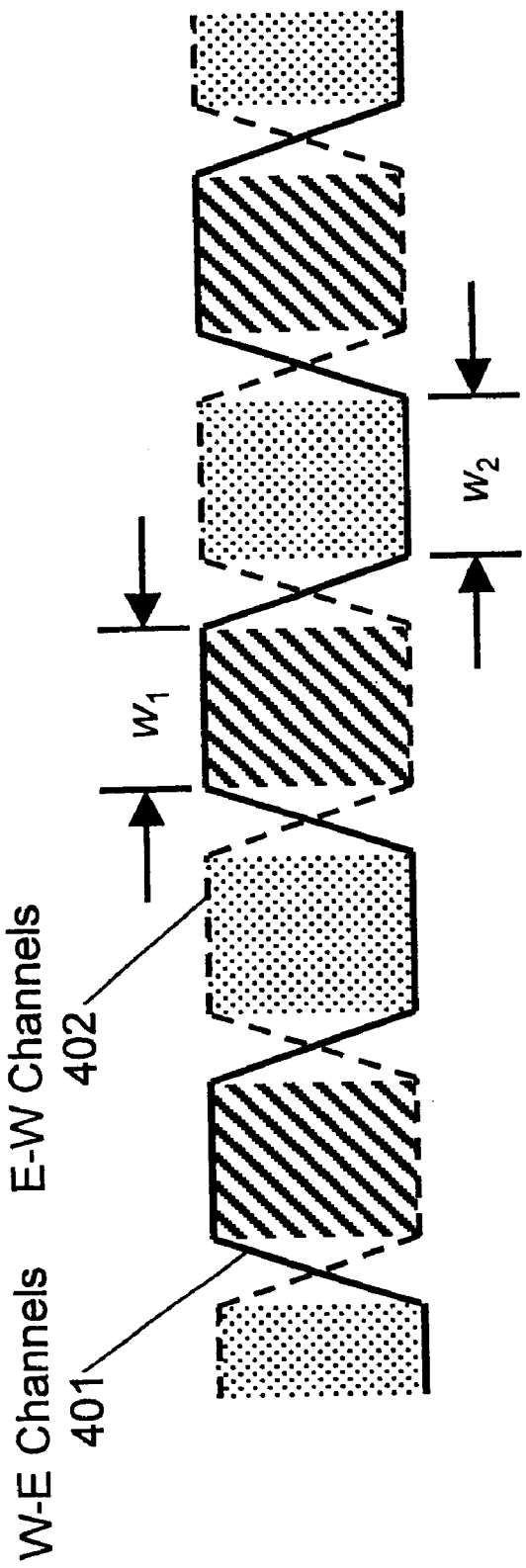
FIGS. 4A–4C are schematic illustrations of configurations of optical transmission bands in symmetrically and asymmetrically interleaved wavelength-division multiplexed bi-directional lightwave transmission systems.
Figure 4B:
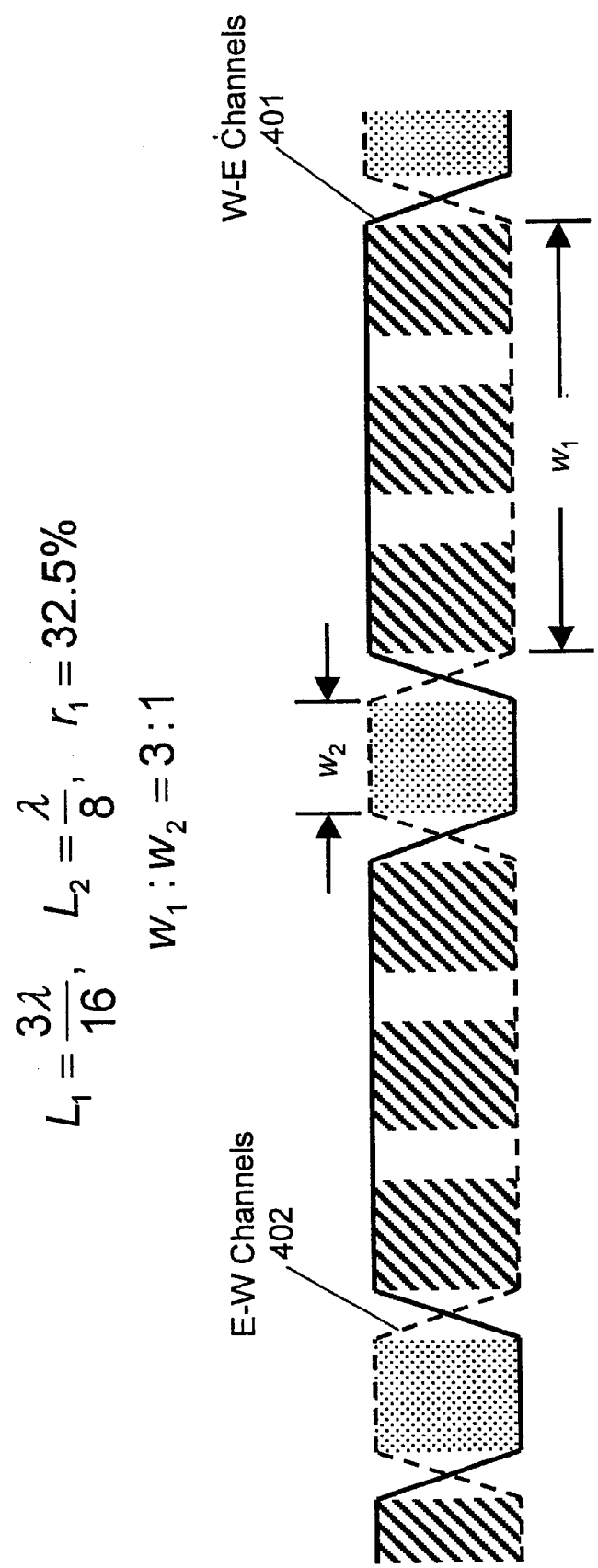
Figure 4C:
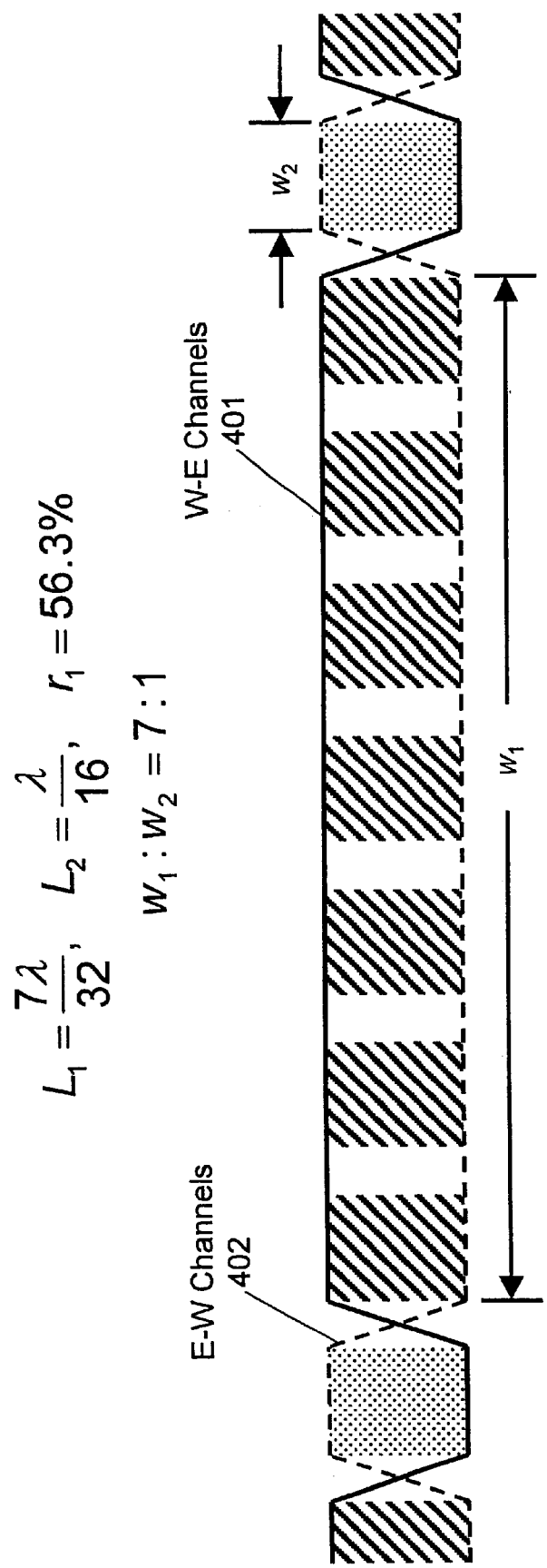

FIGS. 4A–4C illustrate a more complex form of bi-directional transmission, herein termed "interleaved bi-directional" transmission. In interleaved bi-directional transmission, one set of channels propagates in one direction along an optical fiber while the remaining set of channels propagates in the other direction, wherein the first and second sets are interleaved with each other. For instance, in FIG. 4A, the first set 401 of channels denoted by darkly shaded rectangles outlined by solid lines, for example, might comprise the eastbound channels, whereas the second set 402 of channels denoted by lightly shaded rectangles outlined by dashed lines, for example, might comprise the westbound channels. The channels are grouped into bands, wherein there is at least one channel per each transmitted or pass band. Therefore, the set 401 of channels is also a set of pass bands and, likewise, the set 402 of channels is also a set of bands. The aforementioned solid and dashed lines schematically represent the optical pass bands and isolation bands for the first and second channel sets, respectively.

FIG. 4A illustrates symmetric interleaving of wavelength division multiplexed channels, wherein the pass bands of the first set 401 of channels comprise a band width, w1, the pass bands of the second set 402 of channels comprise a band width w2 substantially equal to w1, and channels of the first set and the second set are interleaved or alternate with one another. FIGS. 4B and 4C schematically illustrate two examples of asymmetric interleaving of wavelength division multiplexed channels, wherein the two band widths of the two channel sets, w1 and w2, are not identical to one another and the pass bands of one (or the other) of the interleaved sets may comprise more than one channel. Shaded rectangles in each of FIGS. 4A, 4B, and 4C schematically illustrate the widths and positions of conventional wavelength division multiplexed channels. Thus, as shown in FIG. 4B, each of the pass bands of the first set 401 and second set 402 of bands encompasses or comprises three conventional channels and a single conventional channel, respectively. In FIG. 4C, each of the pass bands of the first set 401 and second set 402 of bands encompasses or comprises seven conventional channels and a single conventional channel, respectively. In either symmetric or asymmetric interleaving, the pass bands of the first band set overlap the isolation bands of the second band set and vice versa.

Each pass band of either band set may comprise multiple conventional channels, as shown in FIGS. 4B and 4C, or else may comprise a single channel of non-conventional band width. In either symmetric or asymmetric interleaving, pass bands of the first and second channel sets are interleaved with one another and one channel set propagates in a first direction and the other channel set propagates in a second direction opposite to the first direction. Such symmetric and asymmetric wavelength division channel interleaving, as illustrated in FIGS. 4A–C are disclosed in a co-pending U.S. patent application titled Dense Wavelength Division Multiplexer Utilizing An Asymmetric Pass Band Interferometer, which is incorporated herein by reference.

Figure 2:
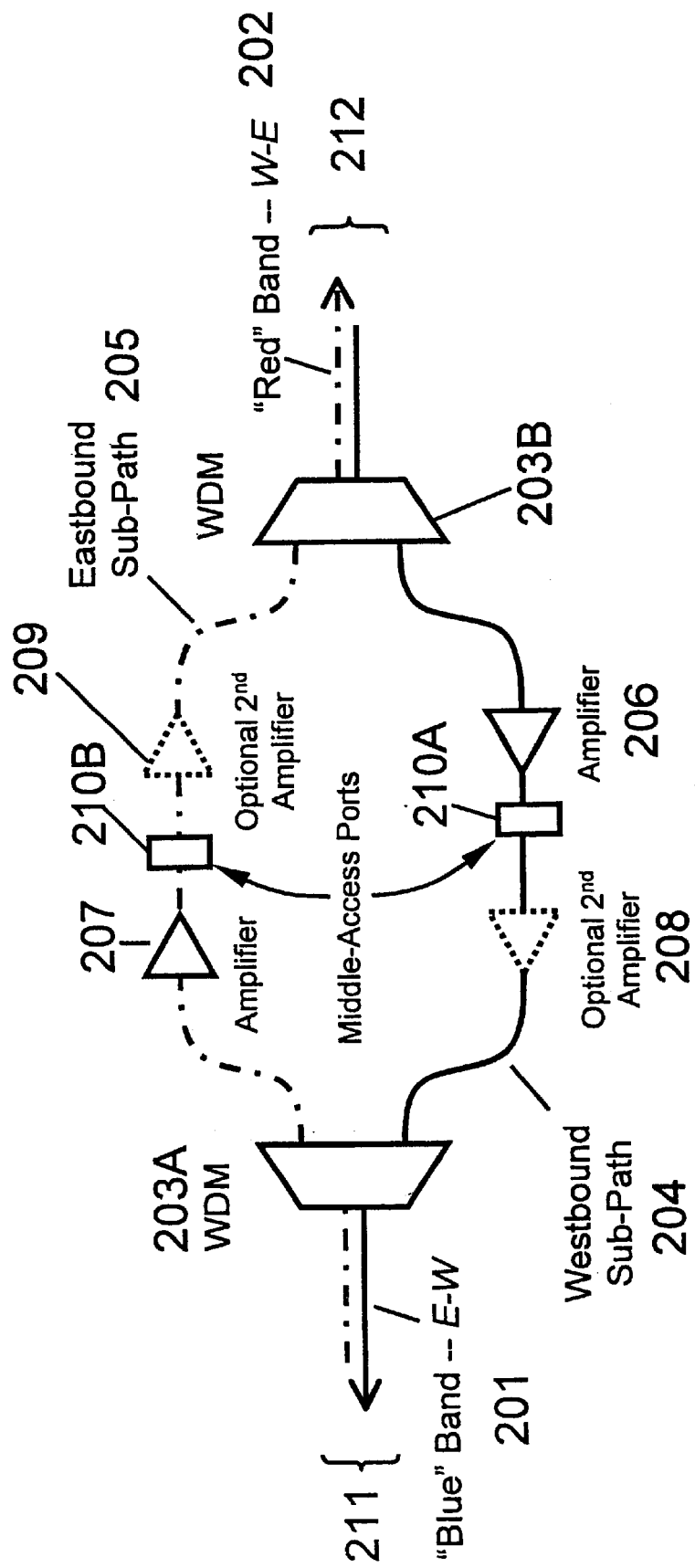
FIG. 2 is a basic block diagram of a prior-art system of optical amplifiers for separate amplification of component sub-signals of a bi-directional optical transmission system.
Figure 3:
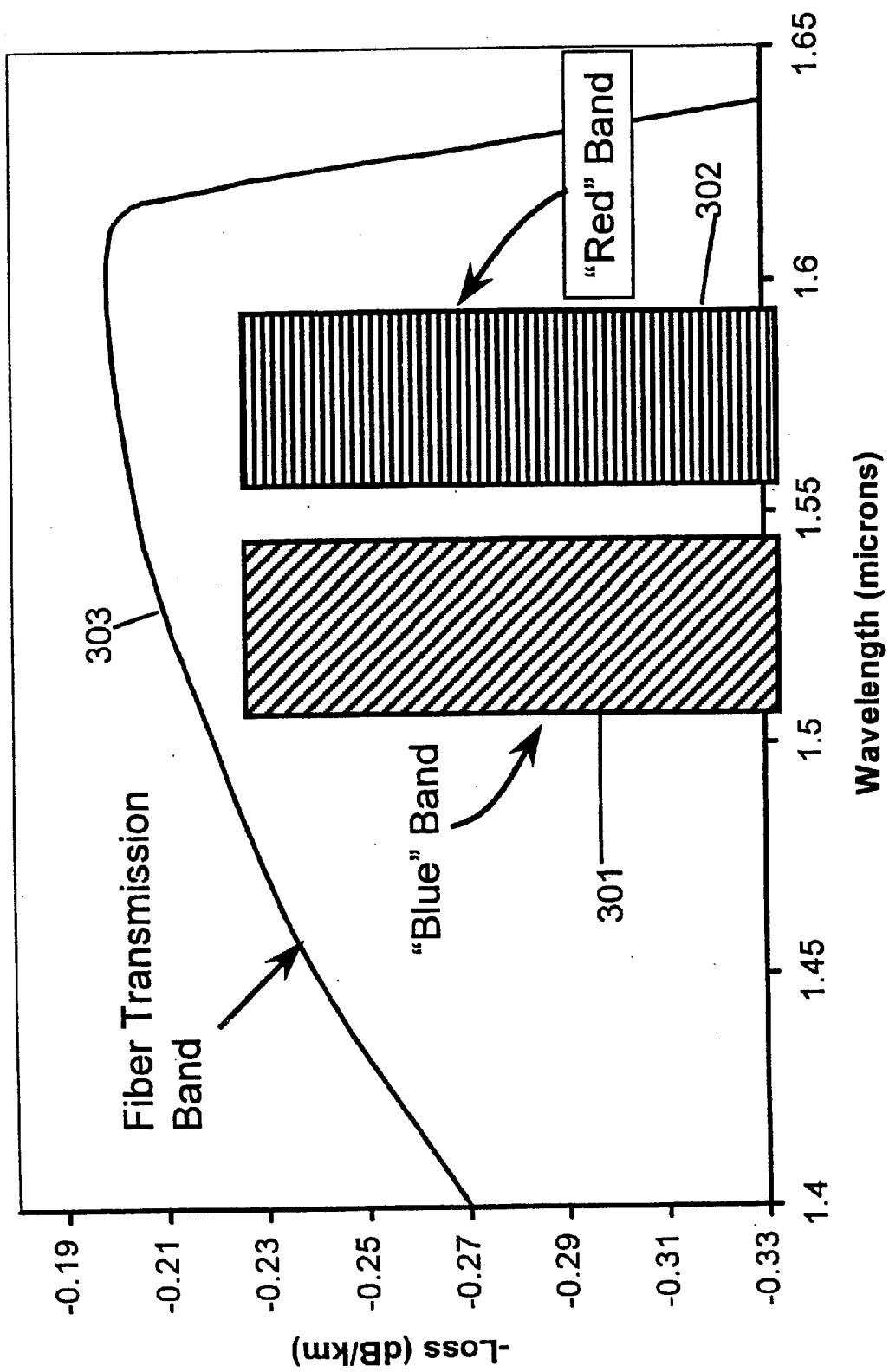
FIG. 3 is a schematic graph of one possible arrangement of wavelength constitution of optical transmission bands in a band-bi-directional lightwave transmission system.

Functionally, the set of bands 401 corresponds to the red channel 302 of FIG. 3 and the eastbound signal 202 of FIG. 2 while the set of channels 402 corresponds to the blue channel 301 and the westbound signal 201. In this document, the eastbound set of interleaved bands or channels, such as the set of bands 401, is also referred to as the set of "odd-numbered" channels or "odd" channels and the westbound set of interleaved bands or channels, such as the set of bands 402, is also referred to as the set of "even-numbered" channels or "even" channels. Such "odd" and "even" designations are arbitrary and do not imply any particular channel plan or numbering scheme. The interleaved bi-directional scheme (FIGS. 4A–C) is preferable to the band bi-directional scheme (FIG. 3) because any non-wavelength-uniform properties of the fiber will be distributed evenly between the eastbound and westbound channels.

Figure 5:
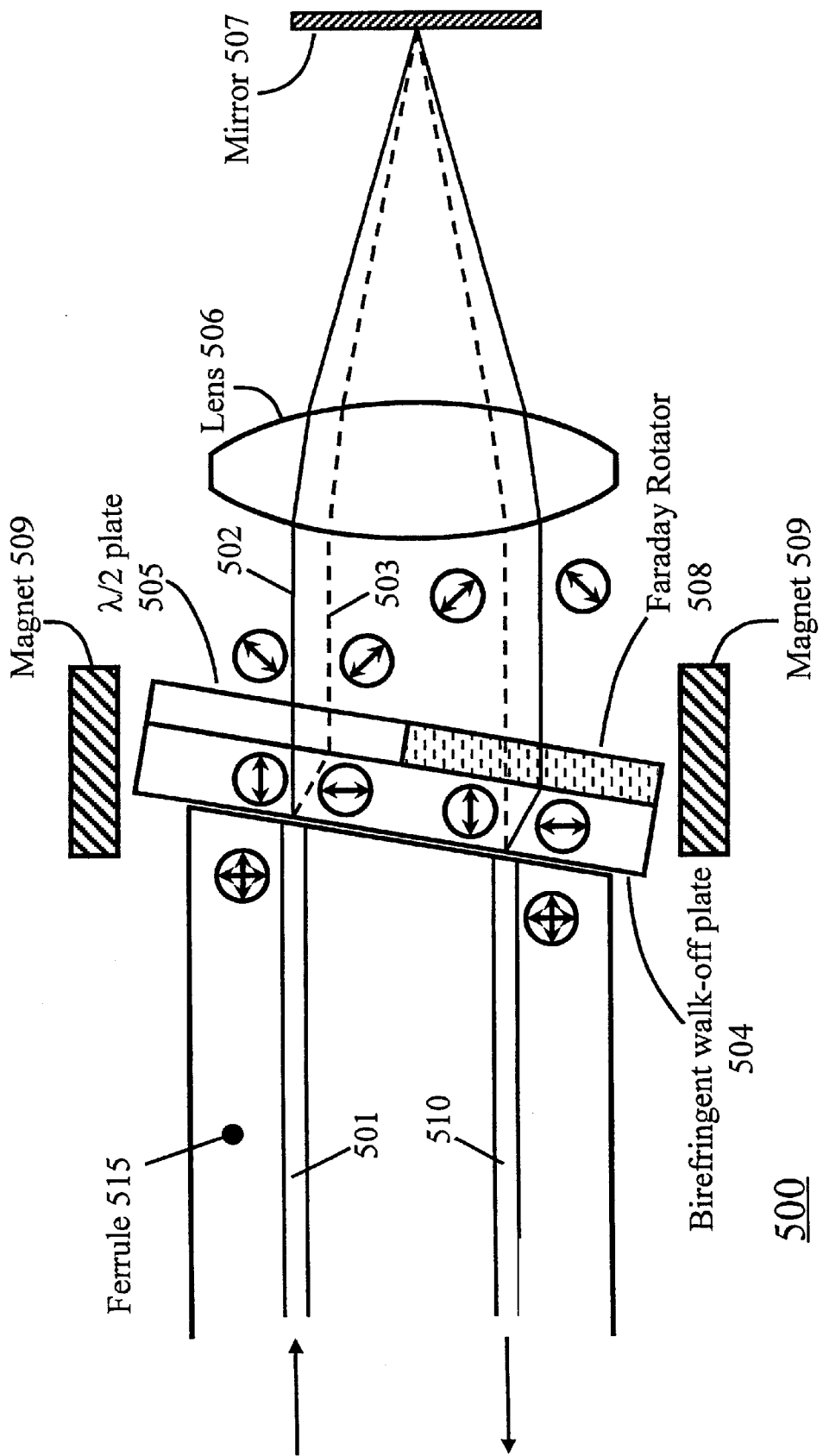
FIG. 5 is a side view of a single-stage polarization independent optical isolator showing central ray paths for forward propagating light signals with each of the two principal polarization directions, disclosed in Reflection-Type Polarization-Independent Optical Isolator, Optical Isolator/Amplifier/Monitor, and Optical System.
Figure 6:
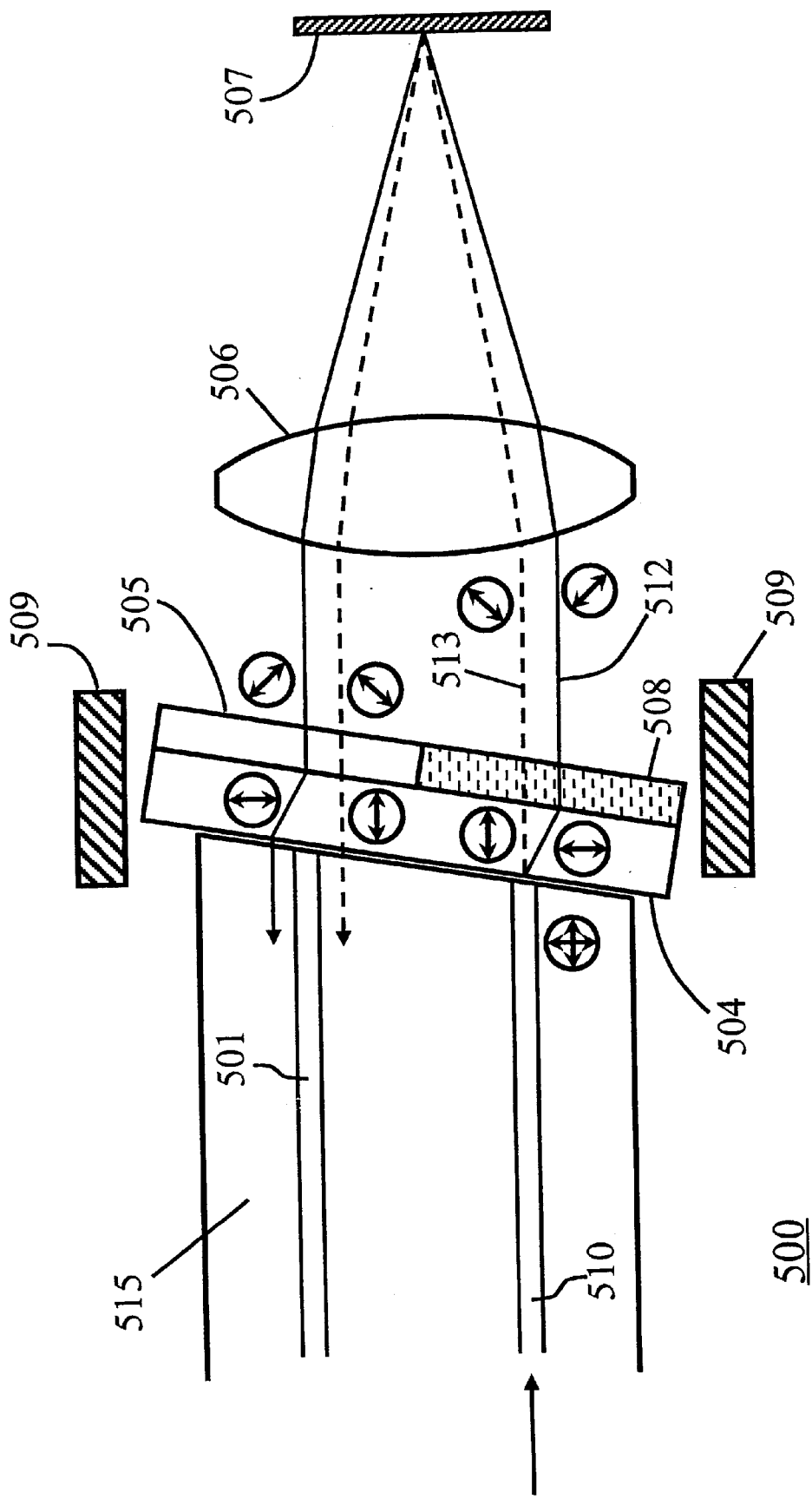
FIG. 6 is a side view of a single-stage polarization independent optical isolator showing central ray paths for reverse propagating light signals with each of the two principal polarization directions, disclosed in Reflection-Type Polarization-Independent Optical Isolator, Optical Isolator/Amplifier/Monitor, and Optical System.

FIGS. 5 and 6 show side views of one embodiment of a single-stage polarization independent optical isolator which is disclosed in co-pending U.S. patent application entitled Reflection-Type Polarization-Independent Optical Isolator, Optical Isolator/Amplifier/Monitor, and Optical System, incorporated herein by reference.

In both FIG. 5 and FIG. 6, as well as in all other subsequent figures herein, solid and/or dashed lines with directional arrows affixed represent signal (light ray) trajectories and circles containing one or two double-headed arrows represent light beam polarization directions of the signals to which they are adjacent. Neither these trajectory indicators nor polarization direction indicators represent actual physical components of the embodiments to which they apply and are provided as visual aids for the reader. Furthermore, the polarization direction indicators are all drawn and are always drawn as if the respective device were viewed end-on from a fixed reference point at the left side of the respective figure.

FIGS. 5 and 6 each show a single-stage polarization independent optical isolator 500 of Reflection-Type Polarization-Independent Optical Isolator, Optical Isolator/Amplifier/Monitor, and Optical System.

Specifically considering the device of FIG. 5 as drawn therein, unpolarized light entering via the input fiber 501 included in ferrule 515 is first split into sub-signals, 502 and 503 by the birefringent walk-off plate 504. The principal optical axes of birefringent walk-off plate 504 are aligned such that sub-signal 502 propagates therethrough as an ordinary ray (o-ray) and is not deflected while sub-signal 503 propagates therethrough as an extraordinary ray (e-ray) and is deflected by the well-known birefringence walk-off effect. After passing through element 504, each of the sub-signals enters the $\lambda/2$ (half-wave) plate 505 which reciprocally rotates the polarization of each of the sub-signals 502 and 503 by 45° in a counterclockwise direction. Both sub-signals 502 and 503 are collimated by lens 506 onto mirror 507 that reflects them back to and through lens 506. Lens 506 then directs the reflected light through the Faraday rotator 508 which, in response to a magnetic field applied by magnets 509, non-reciprocally rotates the polarization of both sub-signals 502 and 503 by 45° in a counterclockwise direction. After passing through the Faraday rotator 508, both sub-signals 502 and 503 re-enter the birefringent walk-off plate 504 such that sub-signal 502 is polarized as an e-ray and sub-signal 503 is polarized as an o-ray. Sub-signal 502 therefore re-enters the birefringent walk-off plate 504 as an e-ray and is deflected by an amount equal and opposite to the original deflection of sub-signal 503. Furthermore, sub-signal 503 re-enters element 504 as an o-ray and is not deflected. Because of these switches in character upon re-entering element 504, from o-ray to e-ray for sub-signal 502 and from e-ray to o-ray for sub-signal 503, their deflections in the birefringent walk-off element 504 are canceled and these two sub-signals thus recombine (after passage through element 504) and enter the output fiber 510 as a single combined signal.

Optical isolators generally contain at least one reciprocal (or reversible) polarization rotator (or "rotator", for short) and one non-reciprocal (or non-reversible) polarization rotator. For instance, in the embodiment of FIG. 5 and FIG. 6, the reciprocal rotator is the $\lambda/2$ (half-wave) plate 505 and the non-reciprocal rotator is the Faraday rotator 508 together with the associated magnets 509. Both such optical elements are used such that the direction of the plane of plane polarized light that passes through them is rotated after such passage. When so used, reciprocal rotators have the property such that, given the polarization direction of a traversing light beam both to one side and to the other side of the element, it is impossible to determine the propagation direction of the light beam. Equivalently stated, for polarization plane rotation by a reciprocal rotator, the direction of rotation, either clockwise (CW) or counter-clockwise (CCW), is always the same when viewed facing the rotator towards the side at which the plane polarized light beam enters the element. Conversely, non-reciprocal (non-reversible) rotators have the property such that the direction of polarization plane rotation, either clockwise (CW) or counter-clockwise (CCW), is always the same when viewed facing the rotator from a fixed reference point in a fixed direction, regardless of the propagation direction of the light ray through the element.

In the following discussions, the terms "clockwise" and/or "counterclockwise" are used to illustrate the rotations imposed upon the light polarization planes of signal rays by certain optical elements. Such terms are used only in a relative sense for any given apparatus. One of ordinary skill in the art will recognize that the terms "clockwise" (or CW) and "counterclockwise" (or CCW) may be interchanged one for the other within the description of any given apparatus without departing from the spirit or scope of the present invention. Likewise, the terms "horizontal" or "horizontally" and "vertical" or "vertically" are used herein in a relative sense only and do not imply any particular spatial orientation of any apparatus or components therein.

Keeping these points in mind, FIG. 6 illustrates the behavior of light rays propagating in the reverse direction through the polarization independent optical isolator 500. Light entering the device 500 via output fiber 510 is first split by the birefringent element 504 into sub-signals 512 and 513. In this case, sub-signal 512 passes through element 504 as a vertically polarized e-ray and is deflected whereas sub-signal 513 passes through as a not deflected horizontally polarized o-ray. Both sub-signals 512 and 513 then pass through the Faraday rotator 508 which non-reciprocally rotates the polarization planes of both by 45° in the counterclockwise direction. Sub-signals 512 and 513 are then collimated by lens 506 onto mirror 507, which reflects them back to and through lens 506. Lens 506 then directs the reflected signals 512 and 513 to the λ/2 plate 505 which rotates the plane of polarization of both of them by 45° counterclockwise. Because element 505 is a reciprocal rotator, this counterclockwise rotation is as viewed facing toward the side at which the signal entry occurs. However, as viewed end-on from a fixed reference point at the left side of the figure, this rotation is in a clockwise direction. After the rotation by λ/2 plate 505, both sub-signals 512 and 513 re-enter the birefringent walk-off plate 504 such that sub-signal 512 is vertically polarized and sub-signal 513 is horizontally polarized. The horizontally polarized sub-signal 513 passes through element 504 as an o-ray and is not deflected; conversely the vertically polarized sub-signal 512 passes through element 504 as an e-ray and is deflected for a second time by an amount equal and opposite to its original deflection after exiting fiber 510. Because of these signal trajectories, the sub-signals 512 and 513 fail to re-combine and both fail to enter the input fiber 501 in the reverse direction. Thus, the function of the optical isolator as a "one-way gate" is realized.

As in the case of the isolators discussed herein above with reference to FIGS. 1–4C, nothing in the operation of the single stage polarization independent optical isolator disclosed in co-pending U.S. patent application Reflection-Type Polarization-Independent Optical Isolator, Optical Isolator/Amplifier/Monitor, and Optical System, as shown in FIGS. 5 and 6 herein above, changes its fundamental character with changing wavelength, and such isolators generally perform this "one-way gate" function regardless of the wavelength of light which is input to them. Thus, as in the case of the isolators discussed herein above with reference to FIGS. 1–4C, in order to realize the function of a bi-directional optical amplifier as discussed above, the eastbound and westbound signals must be bifurcated and two optical amplifiers must be used as in FIG. 2, with each of the two optical amplifiers associated with its own set of unidirectional optical isolators as in FIG. 1.

The present invention is now explained in further detail, with reference to FIGS. 7–21.

Figure 7:
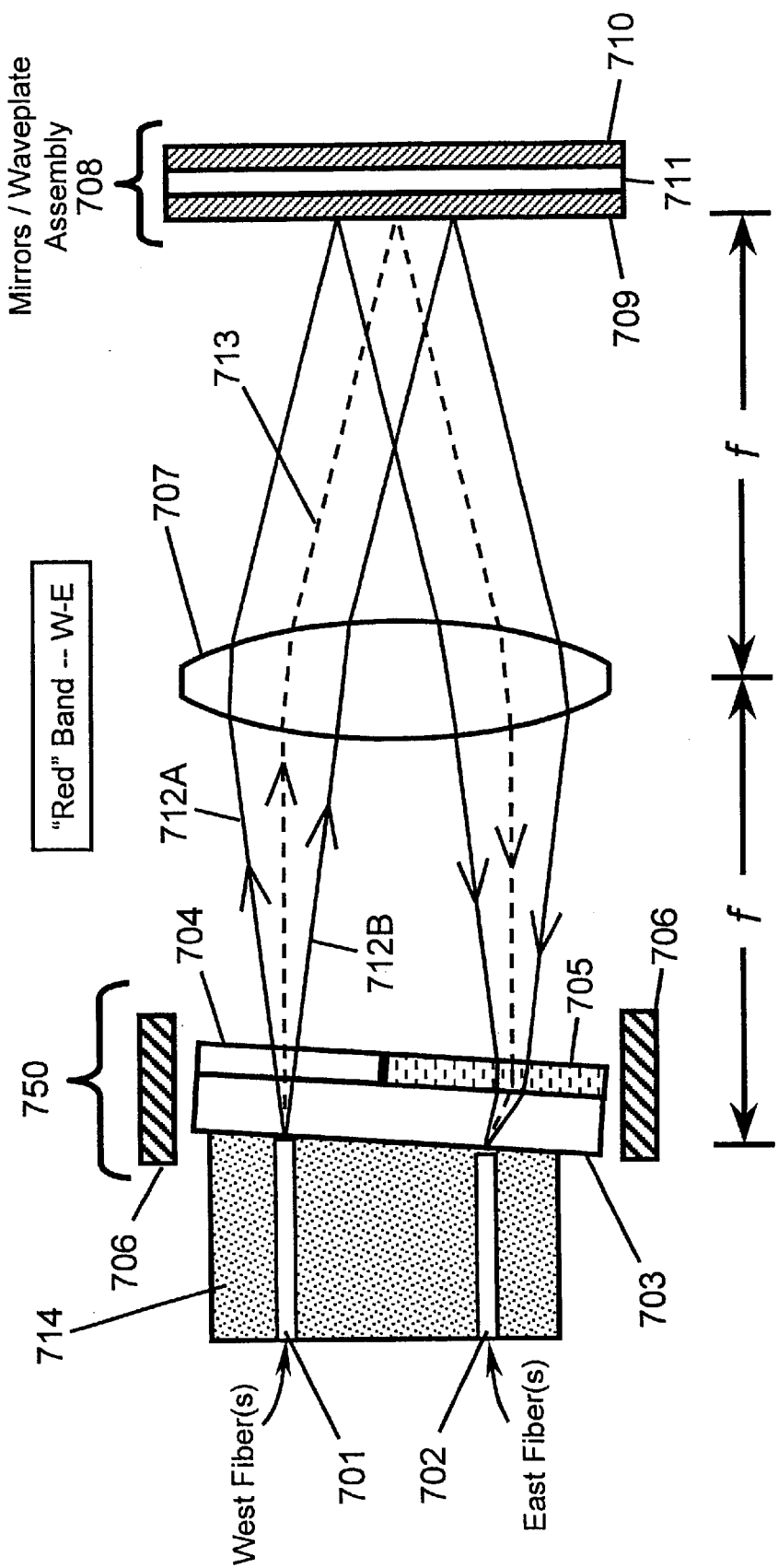
FIG. 7 is a side view of an embodiment of a single-stage band bi-directional polarization independent optical isolator of the present invention showing bounding ray paths of the full assemblage of ray paths for light signals of the red (eastbound) band propagating west-to-east and having one of the two principal polarization directions.
Figure 9:
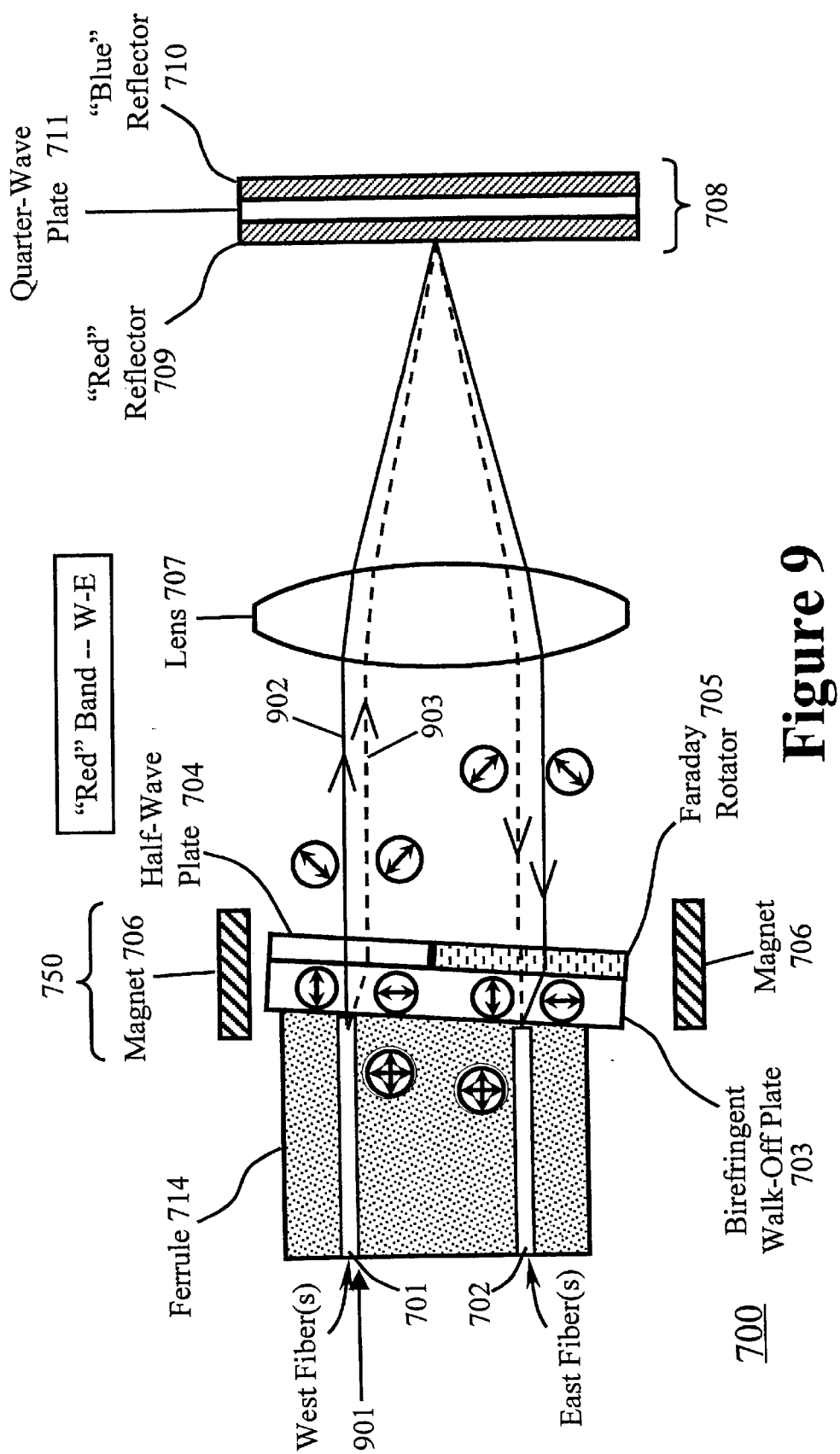
FIG. 9 is a side view of the embodiment of a single-stage band bi-directional polarization independent optical isolator of the present invention showing central ray paths for light signals of the red (eastbound) band propagating west-to-east and corresponding to each of the two principal polarization directions.
Figure 10:
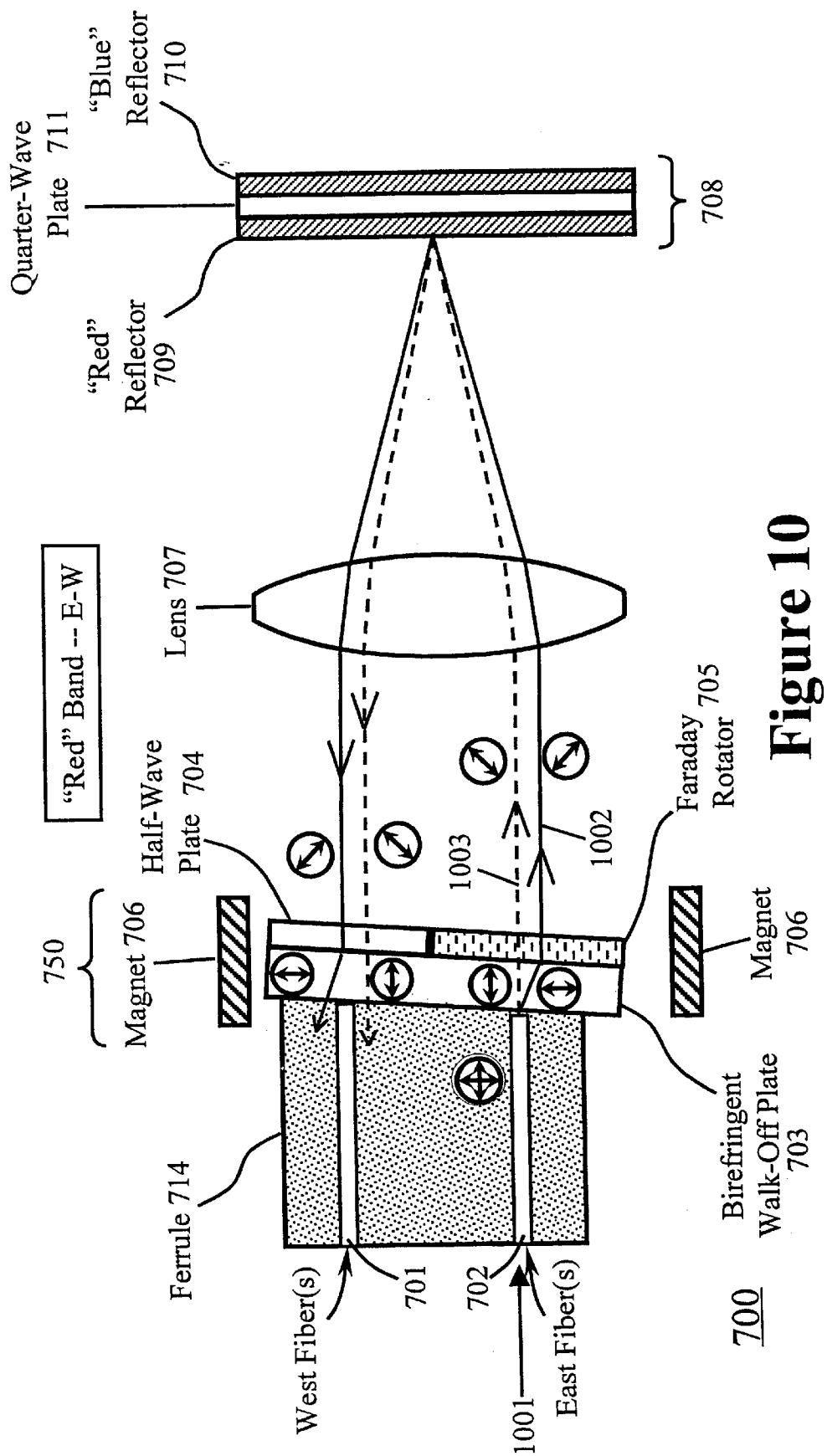
FIG. 10 is a side view of the embodiment of a single-stage band bi-directional polarization independent optical isolator of the present invention showing central ray paths for light signals of the red (eastbound) band propagating east-to-west and corresponding to each of the two principal polarization directions.
Figure 11:
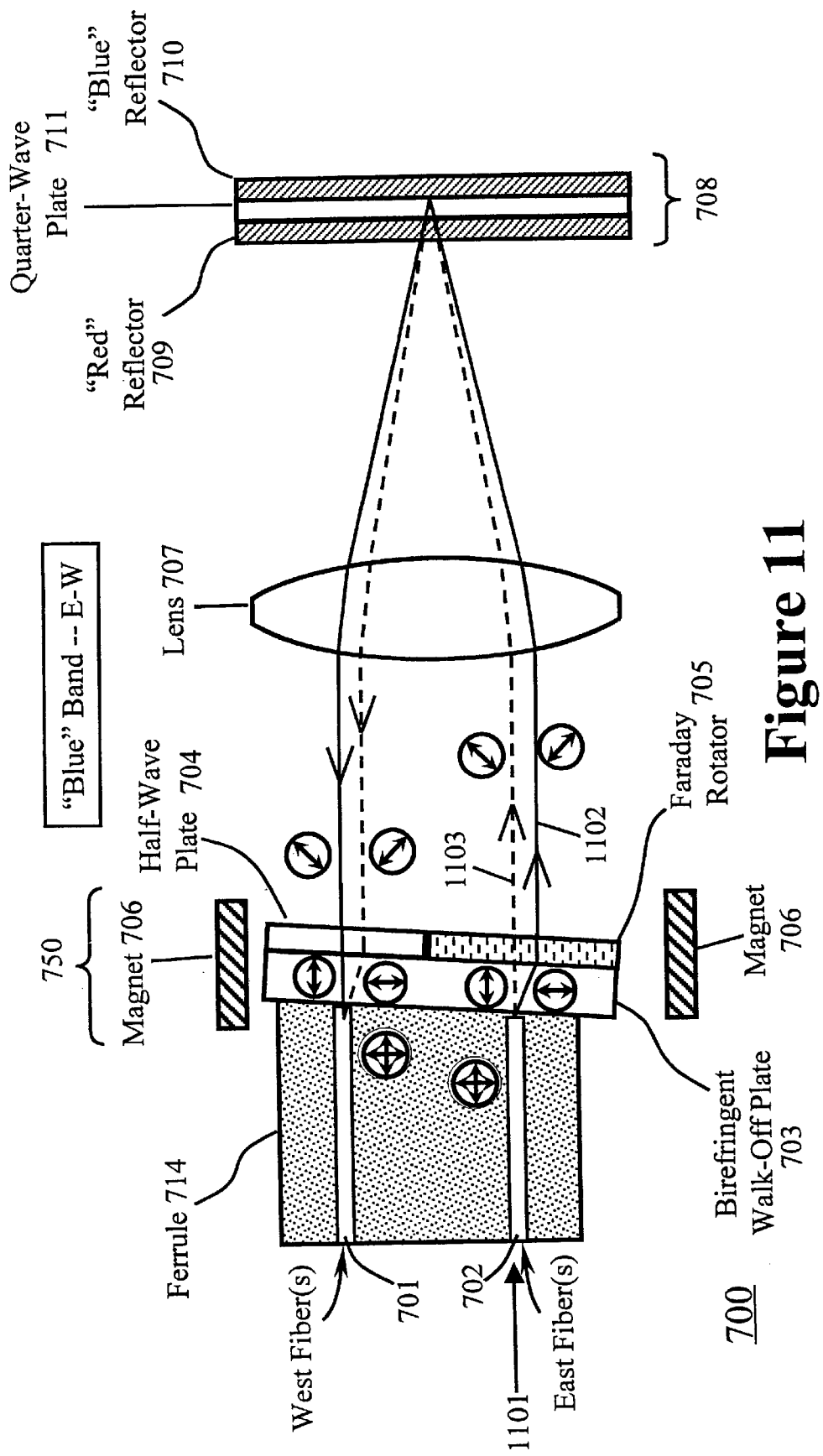
FIG. 11 is a side view of the embodiment of a single-stage band bi-directional polarization independent optical isolator of the present invention showing central ray paths for light signals of the blue (westbound) band propagating east-to-west and corresponding to each of the two principal polarization directions.
Figure 12:
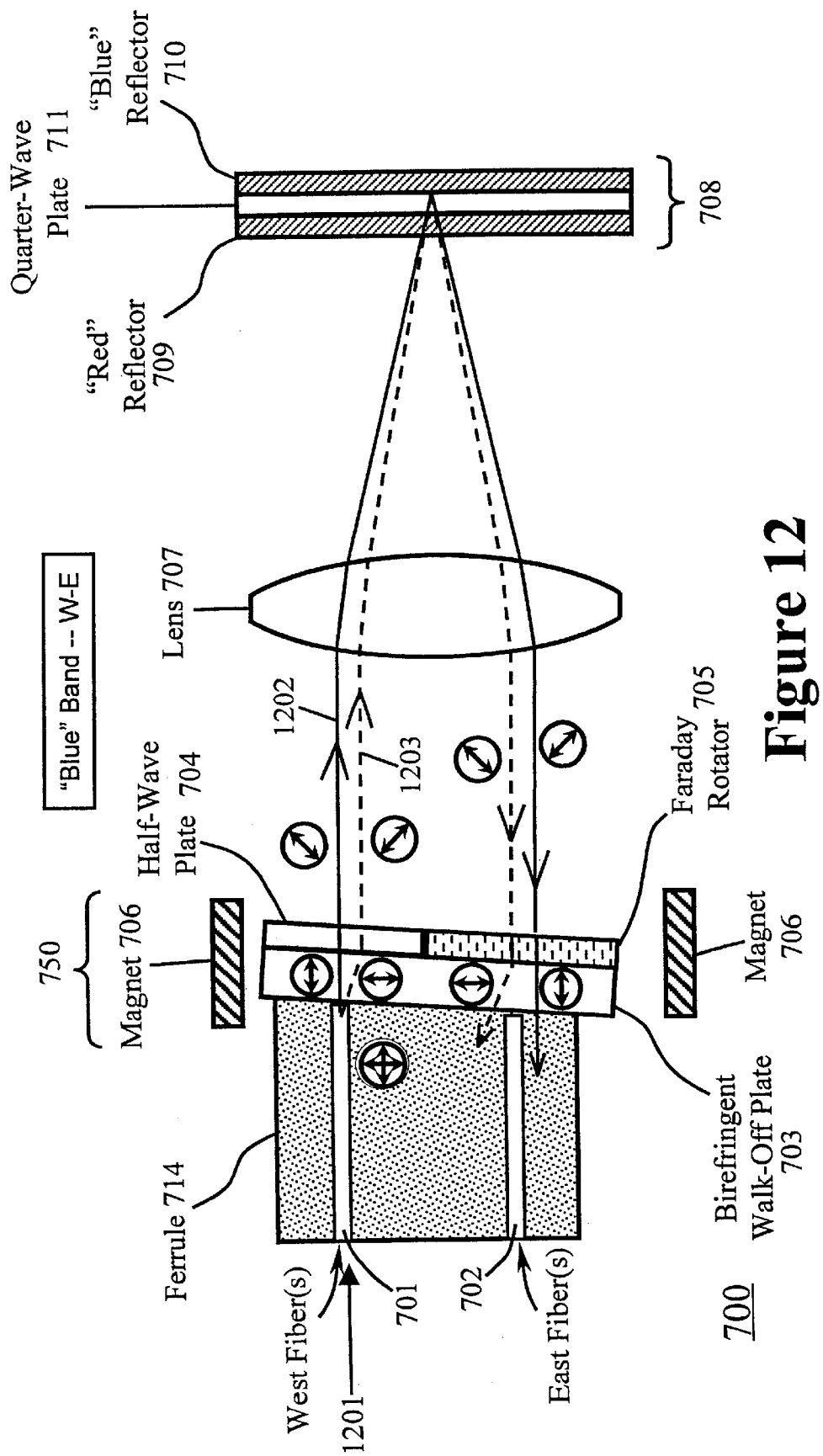
FIG. 12 is a side view of the embodiment of a single-stage band bi-directional polarization independent optical isolator of the present invention showing central ray paths for light signals of the blue (westbound) band propagating west-to-east and corresponding to each of the two principal polarization directions.

The first embodiment of the present invention, which comprises a band bi-directional optical isolator 700, will be described with reference to FIGS. 7–12. FIG. 7 shows the pathway traveled by the "red" band in the west-to-east direction, FIG. 9 likewise shows the pathway traveled by the "red" band in the west-to-east direction, FIG. 10 shows the pathway traveled by the "red" band in the east-to-west direction, FIG. 11 shows the pathway traveled by the "blue" band in the east-to-west direction, and FIG. 12 shows the pathway traveled by the "blue" band in the west-to-east direction, through the isolator 700 of the present invention.

In the embodiment of the band bi-directional optical isolator 700 shown in FIG. 7, reference numeral 714 is an optical fiber holder or housing (ferrule) which can accommodate at least two optical fibers and reference numerals 701 and 702 are two such fibers which are securely contained within ferrule 714. Reference numeral 703 is a birefringent plate (such as rutile or calcite) which is used to physically separate and/or combine light of different polarizations (i.e., having different spatial orientations of the planes of oscillation of the electric field vectors of the light beams) through the well-known birefringent walk-off effect. Briefly, input light is separated by the birefringent plate 703 into an o-ray and an e-ray. Through the birefringent walk-off effect, the birefringent plate 703 displaces the light traveling therethrough as an e-ray by approximately 20 micrometers for every 200 micrometers of thickness of the birefringent plate.

Reference numeral 704 is a λ/2 (half-wave) plate which reciprocally (reversibly) rotates the plane of polarization of light passing through it by 45° in a counter-clockwise (CCW) direction and reference numeral 705 is a Faraday rotation element (Faraday rotator) including magneto-optic material which non-reciprocally rotates the polarization plane of light passing through it by 45° in a counter-clockwise (CCW) direction as viewed from a reference point from the left side of FIG. 7. The polarization plane rotation provided by the Faraday rotator is realized under the influence of a magnetic field provided by magnets 706.

Also as shown in FIG. 7, reference numeral 707 is a lens (or lens assembly) which serves either to collimate light emanating from either of the optical fibers 701 or 702 or to focus light onto the end face of either of those fibers. Light which emanates from either of the fibers 701 or 702 is collimated by lens 707 and is then directed to the mirror/waveplate assembly 708. The mirror/waveplate assembly 708 comprises three elements—a red reflector (mirror) 709 on the side facing the lens, a blue reflector (mirror) 710 on the side away from the lens and a λ/4 (quarter-wave) plate 711 between the red reflector and the blue reflector.

In the mirror/waveplate assembly 708, the red reflector 709 reflects only light having a "red" wavelength, and the blue reflector 710 reflects only light having a "blue" wavelength. Therefore, the light having the "blue" wavelength travels twice through the quarter-wave plate 711. Two passes through a quarter-wave plate is equivalent to one pass through a half-wave plate. The amount by which light passing through the quarter-wave plate 711 is rotated can be controlled, such that, for example, after passing twice through the quarter-wave plate 711, the plane of polarization of the plane polarized light passing therethrough is rotated by 90 degrees relative to the plane of polarization of the light had it not passed twice through the quarter-wave plate 711.

On the other hand, the light having the "red" wavelength does not travel through the quarter-wave plate 711. Since the light having the "red" wavelength and the light having the "blue" wavelength experience different optical paths through the isolator 700 of the present invention, the isolator 700 of the present invention functions bi-directionally, allowing the "red" wavelength light to pass in one direction (west-to-east) and not in another (east-to-west) and "blue" wavelength light to pass in the opposite direction (east-to-west) and not in the other (west-to-east).

In the preferred embodiment, the lens 707 is positioned approximately midway between the ends of the fibers 702 and 703 and the mirror/waveplate assembly 708 such that the distance between the lens 707 and either the mirror/waveplate assembly 708 or the ends of the fibers 702 and 703 is approximately f, the lens focal length of the lens 707. By this means, lens 707 collimates light inputted from either of the fibers 701 or 702 and focuses output light onto either of these fibers. One of ordinary skill in the art will recognize that modifications may be made by which such collimating and/or focusing is performed by one or more lenses which are not necessarily disposed between these fibers and the mirror/waveplate assembly 708. Any and all modifications are within the scope of the present invention.

After reflection by the mirror/waveplate assembly 708, lens 707 focuses the reflected input light onto the Faraday rotator 705. The reflected input light travels through the Faraday rotator 705, being rotated as described herein above, and re-enters the birefringent plate 703. Birefringent plate 703 recombines under the conditions described herein below with reference to FIGS. 9–12 light rays initially separated from each other by the birefringent plate 703 upon their initial traversal therethrough after leaving fiber 701.

Elements 703, 704, 705, and 706 shown in FIG. 7 and in the ensuing figures are collectively referred to as bi-directional polarization independent optical element 750. Generally, bi-directional polarization independent optical element 750 divides input light into ordinary rays and extraordinary rays by birefringent plate 703, rotates the rays by elements 704 and 705, and recombines the rays into output light by birefringent plate 703 if the rays have changed character from the first pass through the birefringent plate 703 to the second pass through the birefringent plate 703 (i.e., rays which were initially divided as ordinary rays have become extraordinary rays, and rays which were initially divided as extraordinary rays have become ordinary rays). Bi-directional polarization independent optical element 750 does not recombine the rays into output light which have not changed character from the first pass through the birefringent plate 703 to the second pass through the birefringent plate 703.

In some circumstances, also described herein below with reference to FIGS. 9–12, upon their second traversal therethrough, birefringent plate 703 further separates from each other light rays initially separated by the birefringent plate 703.

Also shown, for illustrative purposes, in FIG. 7 are representative light ray paths 712A and 712B and 713. Ray paths 712A and 712B represent the loci of two rays that fall on the boundary of the full assemblage of rays in one polarization state which emanate from fiber 701 (or from fiber 702, in the opposite direction). Such boundary exists because, in three dimensions, the light emanating from fiber 701 (or propagating towards 702) comprises a diverging (or converging) cone between the fiber end and lens 707 and comprises a cylinder between the lens 707 and mirror/waveplate assembly 708. Reference numeral 713 represents the unique central light ray at the center of the full assemblage of rays in one polarization state whose boundary is represented by reference numerals 712A and 712B.

Generally, as discussed further below, light emanating from fiber 701 (or 702) and passing through birefringent walk-off plate 703 will exist in two unique polarization states (i.e., having two unique orientations of the planes of linear polarization within which the respective electric field vectors oscillate) determined by the properties of plate 703. Ray paths 712A, 712B and 713 represent only one of these two polarization states; for simplicity, rays of the complementary polarization state are not shown in FIG. 7. It is to be noted that, unless otherwise stated, all subsequent drawings herein will depict representative centrally located rays, such as 713, for both polarization states and, for simplicity, representative bounding rays such as 712A and 712B will not be shown.

Figure 8:
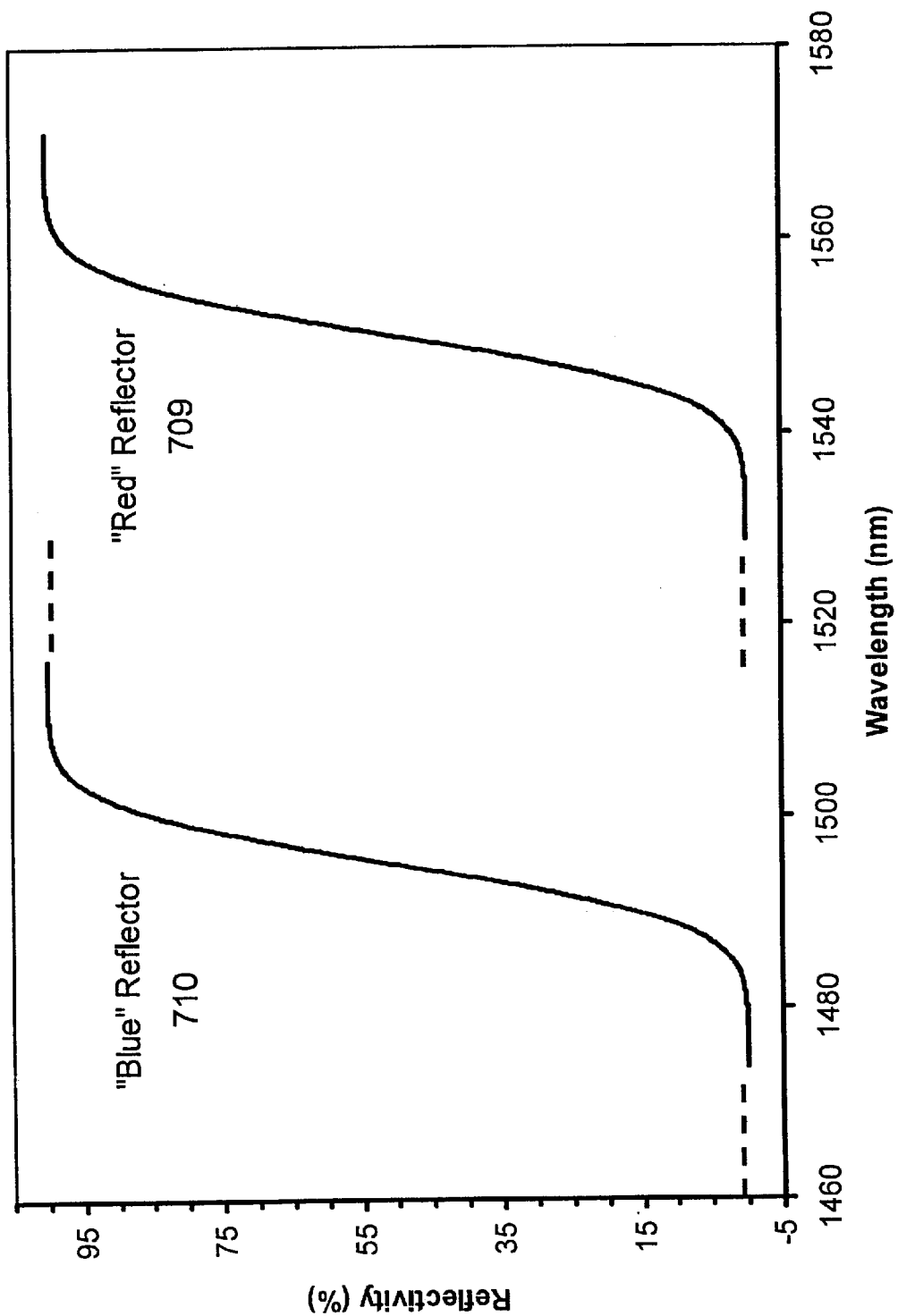
FIG. 8 is a graph of the preferred reflectivity curves, in reflectivity against wavelength, for the two reflective elements of the single-stage band bi-directional optical isolator.

For the mirror/waveplate assembly 708 shown in FIG. 7, FIG. 8 shows idealized mirror reflectivity curves of the preferred variation of reflectivity against wavelength for the "blue" reflector 710 and the "red" reflector 709, respectively, under the assumption that the "red" band and "blue" band as discussed above are as defined in FIG. 3. It is also assumed in the discussion of FIG. 8 that all light that is not reflected by a given reflector is transmitted therethrough although, in practice, a small percentage of light will be absorbed therein.

The reflectivity of the red reflector is chosen so as to reflect preferably 100% of the light signal in the red band (and possibly light of wavelengths longer than those of the red band) while transmitting preferably 100% of light of shorter wavelengths.

Likewise, the reflectivity of the blue reflector is chosen so as to reflect preferably 100% of the light signal in the blue band while transmitting preferably 100% of light of shorter wavelengths.

In this way, the light of wavelengths shorter than the blue band passes completely through the mirror/waveplate assembly 708, whereas the signal light in the red band does not pass through the quarter-wave plate 711 and the light in the blue band passes through the quarter-wave plate 711 twice—once before and once after reflection off the blue reflector 710.

Although the reflectivity of the blue reflector 710 and of the red reflector 709 are illustrated, respectively, by specific curves in FIG. 8, one of ordinary skill in the art will readily recognize that, without departing from the scope or spirit of the present invention, the wavelength definitions of the red and of the blue bands may be chosen differently, and that for such alternate definitions, the reflectivity curves of the two reflectors may need to be varied from those shown in FIG. 8, as appropriate. In fact, it is not intended for the function of the mirror/waveplate assembly 708 to be restricted to the situation in which relatively longer wavelengths are preferentially reflected by the first reflector 709 and shorter wavelengths are preferentially reflected by the second reflector 710. The opposite situation is also possible and is within the spirit and scope of the present invention.

The single-stage band bi-directional polarization independent optical isolator 700 of the present invention is now explained in further detail with reference to FIGS. 9–12. FIGS. 9 and 10 show operation of the isolator 700 on the red band of light, and FIGS. 11 and 12 show operation of the isolator 700 on the blue band of light.

Reference is now made to FIG. 9 and to FIG. 10 to explain the operation of the first embodiment of the present invention as a single-stage isolator for signal light transmission of the red band. In the following explanation, it is assumed that signal light of the red band is ordinarily propagated west-to-east and that fiber 701 is on the logical West side of the isolator 700 whereas fiber 702 is on the logical East side of the isolator 700. More particularly, for the signal light of the red band, fiber 701 is the nominal input fiber and fiber 702 is the nominal output fiber.

In FIG. 9, ray paths and polarization states are indicated for signal light of the red band propagating in its normal west-to-east direction; in FIG. 10 ray paths and polarization states are indicated for signal light of the red band propagating in the undesired east-to-west direction.

As shown in FIG. 9, unpolarized signal light 901 of the red band emanating from the fiber 701 first passes through the birefringent walk-off plate 703. Upon passing through element 703, this signal light is split into sub-signals, 902 and 903. The principal optical axes of birefringent walk-off plate 703 are aligned such that sub-signal 902 propagates therethrough as a horizontally-polarized ordinary ray (o-ray) and is not deflected while sub-signal 903 propagates therethrough as a vertically-polarized extraordinary ray (e-ray) and is deflected by the well-known birefringence walk-off effect.

After passing through element 703, both of the sub-signals 902 and 903 enter the $\lambda/2$ (half-wave) plate 704. The half-wave plate 704 reciprocally rotates the direction of the plane of polarization of each of the sub-signals 902 and 903 by 45° in a counterclockwise direction.

After passage through the half-wave plate 704, both sub-signals 902 and 903 pass through lens 707 which directs them to the mirror/waveplate assembly 708. Because of the reflectivity characteristics of the red reflector as illustrated in FIG. 8, 100% of the red signal light is reflected back by the mirror/waveplate assembly 708 towards the lens 707.

The signal light that is reflected back to and through lens 707 is then directed by that lens 707 to the Faraday rotator 705. The Faraday rotator 705, in response to a magnetic field applied by magnets 706, non-reciprocally rotates the polarization of both sub-signals 902 and 903 by 45° in a counterclockwise direction.

After passing through the Faraday rotator 705, both sub-signals 902 and 903 re-enter the birefringent walk-off plate 703 such that sub-signal 902 is vertically polarized and sub-signal 903 is horizontally polarized. Sub-signal 902 therefore propagates through the birefringent walk-off plate 703 as an e-ray and is deflected by an amount equal and opposite to the original deflection of sub-signal 903. Furthermore, sub-signal 903 propagates through element 703 as an o-ray and is not deflected. Because of these switches in character upon re-entering element 703, from o-ray to e-ray for sub-signal 902 and from e-ray to o-ray for sub-signal 903, their deflections in the birefringent walk-off element 703 are cancelled and these two sub-signals thus recombine after passage through element 703 and enter fiber 702 as a single combined signal.

Now, with reference to FIG. 10, the behavior of light rays of the red band 1001 propagating in the reverse (east-to-west) direction through the first embodiment is discussed. Unpolarized light of the red band emanating from fiber 702 is first split by the birefringent element 703 into sub-signals 1002 and 1003. In this case, sub-signal 1002 passes through element 703 as a vertically polarized e-ray and is deflected whereas sub-signal 1003 passes through as a not deflected horizontally-polarized o-ray.

Both sub-signals 1002 and 1003 then pass through the Faraday rotator 705 that non-reciprocally rotates the polarization planes of both by 45° in the counterclockwise direction. Sub-signals 1002 and 1003 then pass through lens 707 and are directed by that lens onto mirror/waveplate assembly 708.

Because of the reflectivity characteristics of the red reflector as illustrated in FIG. 8, 100% of the red signal light is reflected back towards the lens 707 by mirror/waveplate assembly 708. The signal light 1002 and 1003 that is reflected back to and through lens 707 is then focused by that lens and directed back to the $\lambda/2$ plate 704. The $\lambda/2$ plate 704 then rotates the plane of polarization of both of the sub-signals 1002 and 1003 by 45° counterclockwise. Because element 704 is a reciprocal rotator, this rotation is in a clockwise direction as viewed end-on from the fixed reference point at the left side of the FIG. 10.

After the rotation by $\lambda/2$ plate 704, both sub-signals 1002 and 1003 re-enter the birefringent walk-off plate 703 such that sub-signal 1002 is vertically polarized and sub-signal 1003 is horizontally polarized. The horizontally polarized sub-signal 1003 passes through element 703 as an o-ray and is not deflected; conversely the vertically polarized sub-signal 1002 passes through element 703 as an e-ray and is deflected for a second time by an amount equal and opposite to its original deflection after exiting fiber 702. Because of these sub-signal trajectories, the sub-signals 1002 and 1003 fail to re-combine and both fail to enter the West fiber 701 in the reverse direction. Thus, for signal light of the red band, the single-stage polarization-independent optical isolator of the first embodiment functions as a "one-way gate" permitting only west-to-east passage.

Reference is now made to FIG. 11 and to FIG. 12 to explain in further detail the operation of the band bi-directional polarization independent optical isolator 700 of the first embodiment of the present invention as a single-stage isolator for signal light of the "blue" band. In the following explanation, it is assumed that signal light of the blue band is ordinarily propagated east-to-west and that, as before, fiber 701 is on the logical West side of the band bi-directional polarization independent optical isolator 700, whereas fiber 702 is on the logical East side of the isolator 700. More particularly, for signal light of the blue band, fiber 702 is the nominal input fiber and fiber 701 is the nominal output fiber.

In FIG. 11, ray paths and polarization states are indicated for signal light of the blue band propagating in its normal east-to-west direction; in FIG. 12 ray paths and polarization states are indicated for signal light of the blue band propagating in the undesired west-to-east direction.

With reference to FIG. 11, unpolarized signal light 1101 of the blue band emanating from the fiber 702 first passes through the birefringent walk-off plate 703. Upon passing through element 703, this signal light is split into sub-signals, 1102 and 1103. The principal optical axes of birefringent walk-off plate 703 are aligned such that sub-signal 1103 propagates therethrough as a horizontally-polarized ordinary ray (o-ray) and is not deflected while sub-signal 1102 propagates therethrough as a vertically-polarized extraordinary ray (e-ray) and is deflected by the well-known birefringence walk-off effect.

After passing through element 703, both of the sub-signals 1102 and 1103 enter the Faraday rotator 705. The Faraday rotator 705, in response to a magnetic field applied by magnets 706, non-reciprocally rotates the polarization of both sub-signals 1102 and 1103 by 45° in a counterclockwise direction.

After passing through the Faraday rotator 705, both sub-signals 1102 and 1103 pass through lens 707 which directs them onto the mirror/waveplate assembly 708. Because of the reflectivity characteristics of the red reflector 709 as illustrated in FIG. 8, all of the blue signal light 1102 and 1103 passes through both the reflector 709 and the quarter-wave plate 711 and impinges upon the blue reflector 710.

Because of the reflectivity characteristics of the blue reflector 710, 100% of the blue signal light is reflected back through the quarter-wave plate 711 and red reflector 709 a second time. Upon making two passes through quarter-wave plate 711, sub-signal 1102 and 1103 each incurs a 90-degree rotation of the direction of its plane of polarization. The reflected signal light 1102 and 1103, after making a second pass through the quarter-wave plate 711 and red reflector 709, then passes through lens 707 and is directed by that lens to the λ/2 (half-wave) plate 704.

The λ/2 plate 704 reciprocally rotates the direction of the plane of polarization of each of the sub-signals 1102 and 1103 by 45° in a counterclockwise direction. Because element 704 is a reciprocal rotator, this rotation is in a clockwise direction as viewed end-on from the fixed reference point at the left side of the figure.

After passage through the half-wave plate 704, both sub-signals 1102 and 1103 re-enter the birefringent walk-off plate 703 such that sub-signal 1103 is vertically polarized and sub-signal 1102 is horizontally polarized. Sub-signal 1103 therefore propagates through the birefringent walk-off plate 703 as an e-ray and is deflected by an amount equal and opposite to the original deflection of sub-signal 1102. Furthermore, sub-signal 1102 propagates through element 703 as an o-ray and is not deflected. Because of these switches in character upon re-entering element 703, from o-ray to e-ray for sub-signal 1103 and from e-ray to o-ray for sub-signal 1102, their deflections in the birefringent walk-off element 703 are cancelled and these two sub-signals thus recombine after passage through element 703 and enter fiber 701 as a single combined signal.

Now, with reference to FIG. 12, the behavior of light rays of the blue band propagating in the reverse (west-to-east) direction through the first embodiment of the isolator 700 is discussed. Unpolarized light of the blue band 1201 emanating from fiber 701 is first split by the birefringent element 703 into sub-signals 1202 and 1203. In this case, sub-signal 1203 passes through element 703 as a vertically polarized e-ray and is deflected whereas sub-signal 1202 passes through as a not deflected horizontally polarized o-ray.

Both sub-signals 1202 and 1203 then pass through the λ/2 plate 704 that reciprocally rotates the polarization planes of both by 45° in the counterclockwise direction.

Sub-signals 1202 and 1203 then pass through lens 707 and are directed by that lens onto mirror/waveplate assembly 708. Because of the reflectivity characteristics of the red reflector 709 as illustrated in FIG. 8, all of the blue signal light 1202 and 1203 passes through both the reflector 709 and the quarter-wave plate 711 and impinges upon the blue reflector 710.

Because of the reflectivity characteristics of the blue reflector 710, 100% of the blue signal light is reflected back through the quarter-wave plate 711 and red reflector 709 a second time. Upon making two passes through quarter-wave plate 711, sub-signal 1202 and 1203 each incurs a 90-degree rotation of the direction of its plane of polarization.

The reflected signal light 1202 and 1203, after making a second pass through the quarter-wave plate 711 and red reflector 709, then passes through lens 707 and is directed by that lens to the Faraday rotator 705.

The Faraday rotator 705 then non-reciprocally rotates the planes of polarization of both of the sub-signals 1202 and 1203 by 45° in a counterclockwise direction.

After the rotation by the Faraday rotator 705, both sub-signals 1202 and 1203 re-enter the birefringent walk-off plate 703 such that sub-signal 1203 is vertically polarized and sub-signal 1202 is horizontally polarized.

The horizontally polarized sub-signal 1202 passes through element 703 as an o-ray and is not deflected; conversely the vertically polarized sub-signal 1203 passes through element 703 as an e-ray and is deflected for a second time by an amount equal and opposite to its original deflection after exiting fiber 701.

Because of these sub-signal trajectories, the sub-signals 1202 and 1203 fail to re-combine and both fail to enter the East fiber 702 in the reverse direction. Thus, for signal light of the blue band, the single-stage polarization-independent optical isolator of the first embodiment of the isolator 700 of the present invention functions as a "one-way gate" permitting only east-to-west passage.

The second embodiment of the present invention, which comprises an interleaved bi-directional optical isolator, will now be described with reference to FIGS. 13–18.

Figure 13:
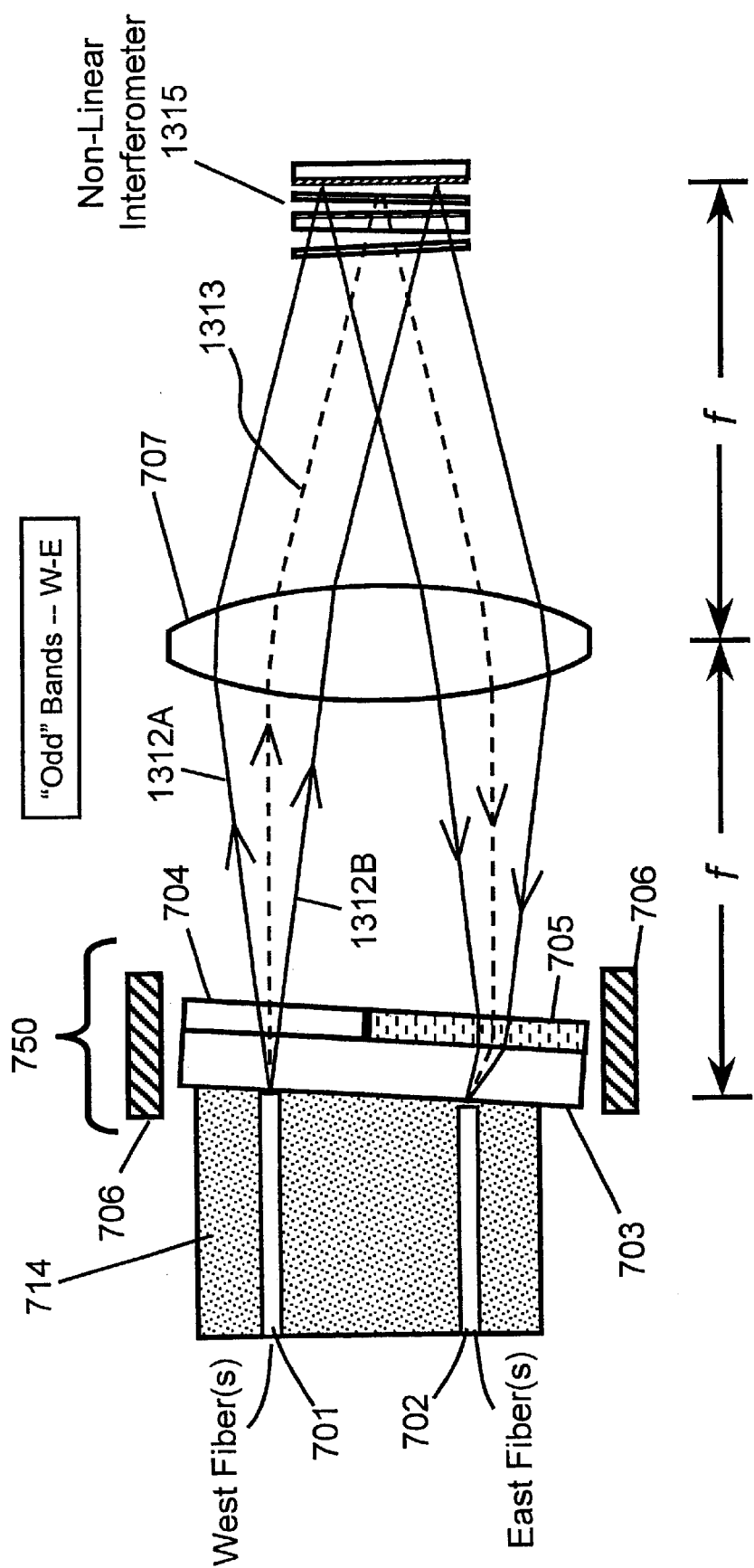
FIG. 13 is a side view of an embodiment of a single-stage interleaved bi-directional polarization independent optical isolator of the present invention showing bounding ray paths of the full assemblage of ray paths for light signals of the odd numbered (eastbound) channels propagating west-to-east and having one of the two principal polarization directions.

FIG. 13 shows a cross-sectional view of the embodiment of the interleaved bi-directional optical isolator 1300 of the present invention, and, more particularly, the pathways traveled by a first set of interleaved bands of light in the west-to-east direction therethrough. Such first set of interleaved bands may comprise, for instance, one of either of the two sets of bands illustrated in FIGS. 4A–4C. This first set of interleaved bands is interleaved or interspersed, in wavelength, together with a second set of interleaved bands as illustrated in FIGS. 4A–4C. Each band of each of the first and second sets of interleaved bands may comprise one or a plurality of channels as defined previously.

In FIG. 13, reference numerals 701–707 and 714 refer to components with descriptions and functionalities identical to those already described with reference to FIG. 7. Also in FIG. 13, ray paths 1312A, 1312B, and 1313 are similar to ray paths 712A, 712B, and 713 respectively, with ray paths 1312A and 1312B representing the loci of rays on the boundary of the full assemblage of rays in one polarization state which emanate from either fiber 701 or from fiber 702 and ray path 1313 representing the unique central light ray at the center of the full assemblage of rays in one polarization state.

The interleaved bi-directional isolator 1300 of the present invention differs from the band bi-directional isolator 700 of the present invention through the substitution of a specific non-linear interferometer 1315 for the mirror/waveplate assembly 708 of the band bi-directional isolator 700.

A detailed explanation of the operation of isolator 1300 of the present invention is presented herein below, with reference to FIGS. 15–19, after an explanation of non-linear interferometer 1315 shown in FIG. 13.

The non-linear interferometer 1315 shown in FIG. 13 is disclosed in the above-mentioned co-pending U.S. patent applications respectively entitled Nonlinear Interferometer for Fiber Optic Dense Wavelength Division Multiplexer Utilizing a Phase Differential Method of Wavelength Separation, incorporated herein by reference, and Dense Wavelength Division Multiplexer Utilizing an Asymmetric Pass Band Interferometer, incorporated herein by reference.

Figure 14:
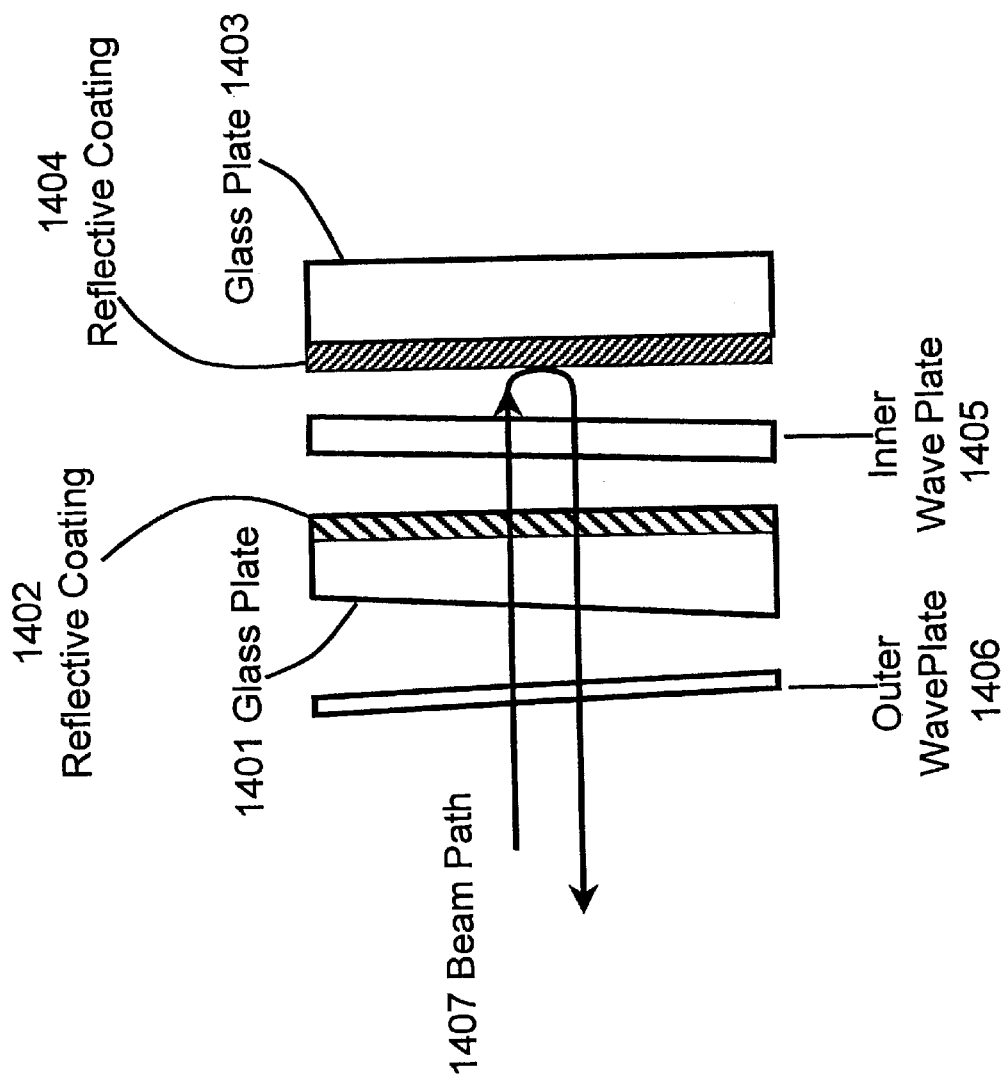
FIG. 14 is a side view of a non-linear interferometer that has the property of rotating the plane of polarization of a first set of interleaved bands by 90° while leaving the plane of polarization of a second set of interleaved bands unchanged.

A detailed cross-sectional view of non-linear interferometer 1315 is given in FIG. 14. The non-linear interferometer 1315 comprises a first (or front) glass plate 1401 whose second (or rear) surface hosts a partially reflective coating 1402 of reflectivity r, a second (or rear) glass plate 1403 whose first (or front) surface hosts a 100% reflective coating 1404, an inner wave plate 1405 between the two coated glass plates 1401 and 1403, and an outer wave plate 1406 adjacent to the front surface of glass plate 1401. The partially reflective coating 1402 and the reflective coating 1404 have reflectivity values of $r_1$ and 100%, respectively, for wavelengths of light comprising signal bands. Furthermore, the outer wave plate 1406 comprises a birefringent differential optical retardance value of $L_1$ (in units of length), and the inner wave plate 1405 comprises a birefringent differential optical retardance value of $L_2$. Because of the 100%, respectively of the reflective coating 1404, all signal light 1407 that enters the non-linear interferometer 1315 is reflected therefrom, as shown in FIG. 14.

The operation of the non-linear interferometer 1315 is such that, of the reflected signal light 1407, linearly polarized signal light having a wavelength corresponding to every one of a first set of bands (for instance, band set 402) will be reflected with a 90° rotation of its plane of polarization whereas linearly polarized signal light of wavelengths corresponding to the remaining bands interleaved with the first set (for instance band set 401) will be reflected without change in polarization.

The specific configuration of interleaved bands, as exemplified by FIGS. 4A–4C, is determined by the choice of the values of the parameters $L_1$, $L_2$ and $r_1$ associated with interferometer 1315. For instance, to obtain the symmetrically interleaved configuration illustrated in FIG. 4A, these three parameters are set at $\lambda/8$, $\lambda/4$, and 18.5%, respectively. To obtain the three-to-one and seven-to-one asymmetric interleaving configurations illustrated in FIGS. 4B–4C, these three parameters are set at $3\lambda/16$, $\lambda/8$, and 32.5% and $7\lambda/32$, $\lambda/16$ and 56.3%, respectively. Other choices of parameter sets lead to different interleaved band configurations than those illustrated in FIGS. 4A–C, and the invention is not intended to be limited to these three particular examples.

The operation of the interleaved bi-directional optical isolator 1300 of the present invention is now discussed with reference to FIGS. 15–18. It is assumed in these FIGS. 15–18 and in the following discussion pertaining thereto that signal light of the first band set 401 has an intended west-to-east propagation direction and that signal light of the second band set 402 has an intended east-to-west propagation direction. The main function and purpose of the isolator 1300 is to permit such intended light propagation while prohibiting any reverse propagation, namely east-to-west propagation of light of the first band set 401 or west-to-east propagation of light of the second band set 402. In similar fashion to the depiction of isolator 700 of the first embodiment of the present invention in FIGS. 9–12, only one representative signal light ray of each polarization state is drawn in the isolator 1300 the second embodiment of the present invention in each of FIGS. 15–18.

Figure 15:
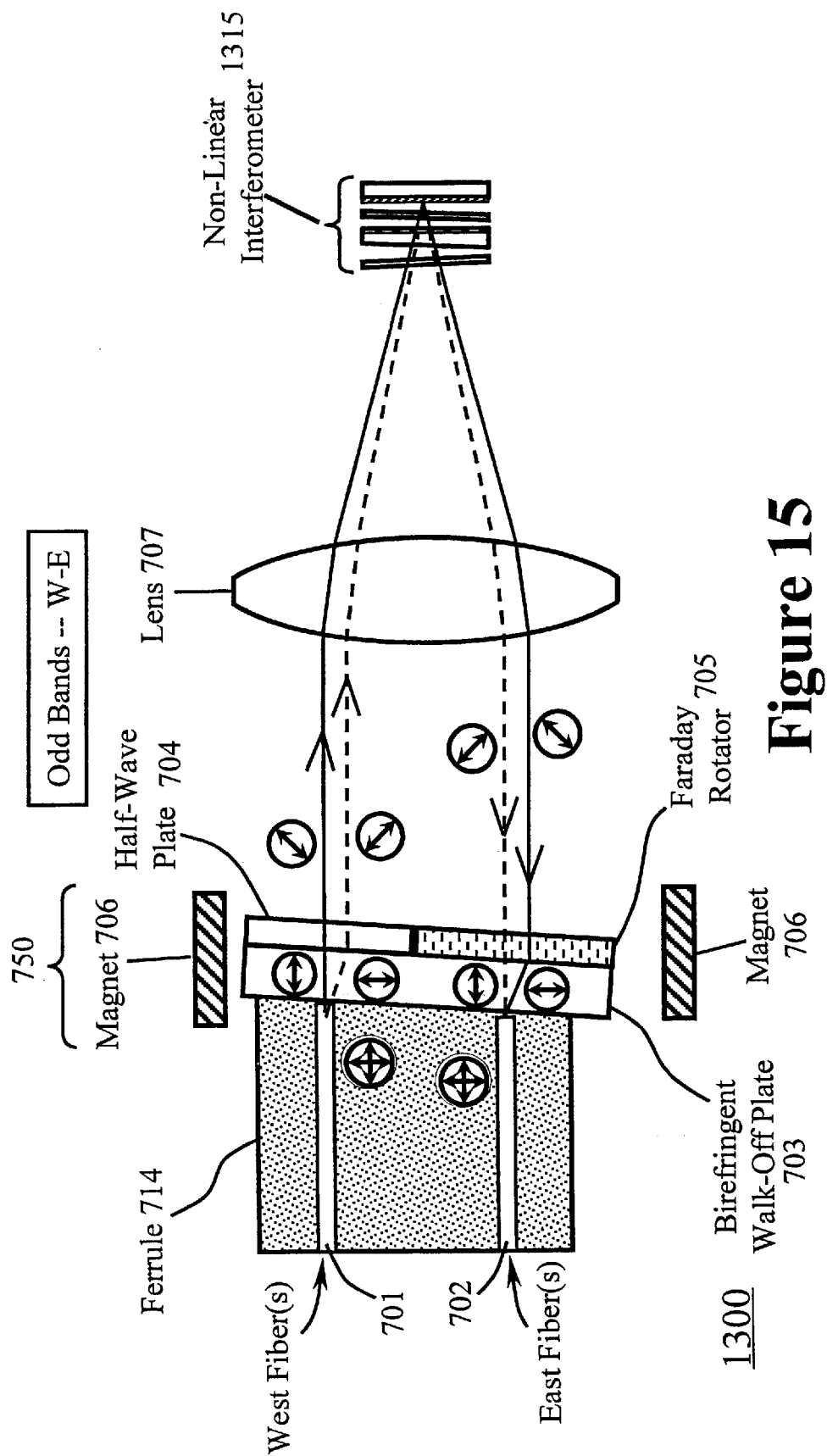
FIG. 15 is a side view of the embodiment of a single-stage interleaved bi-directional polarization independent optical isolator of the present invention showing central ray paths for light signals of the odd (eastbound) channels propagating west-to-east and corresponding to each of the two principal polarization directions.
Figure 16:
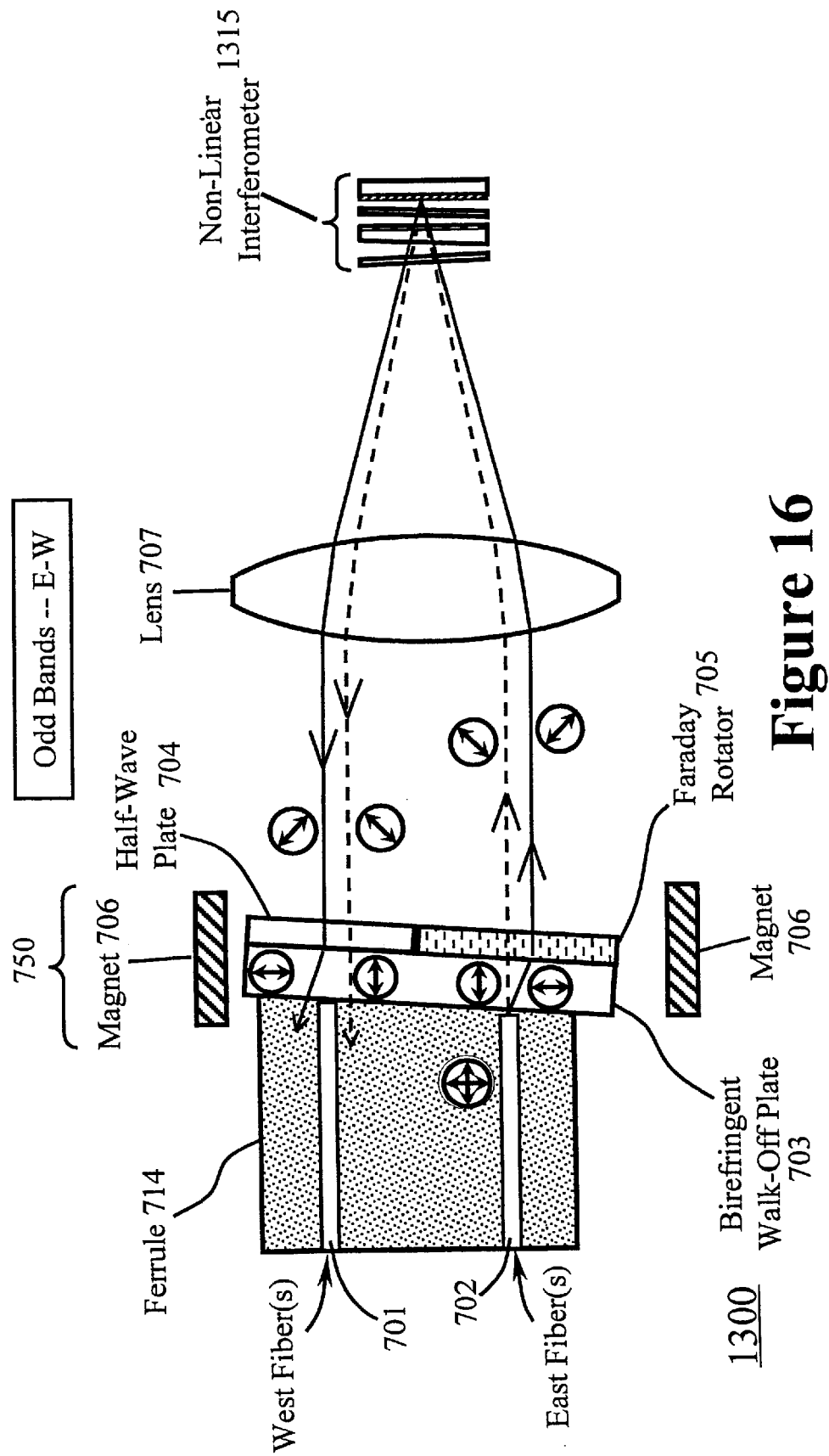
FIG. 16 is a side view of the embodiment of a single-stage interleaved bi-directional polarization independent optical isolator of the present invention showing central ray paths for light signals of the odd (eastbound) channels propagating east-to-west and corresponding to each of the two principal polarization directions.
Figure 17:
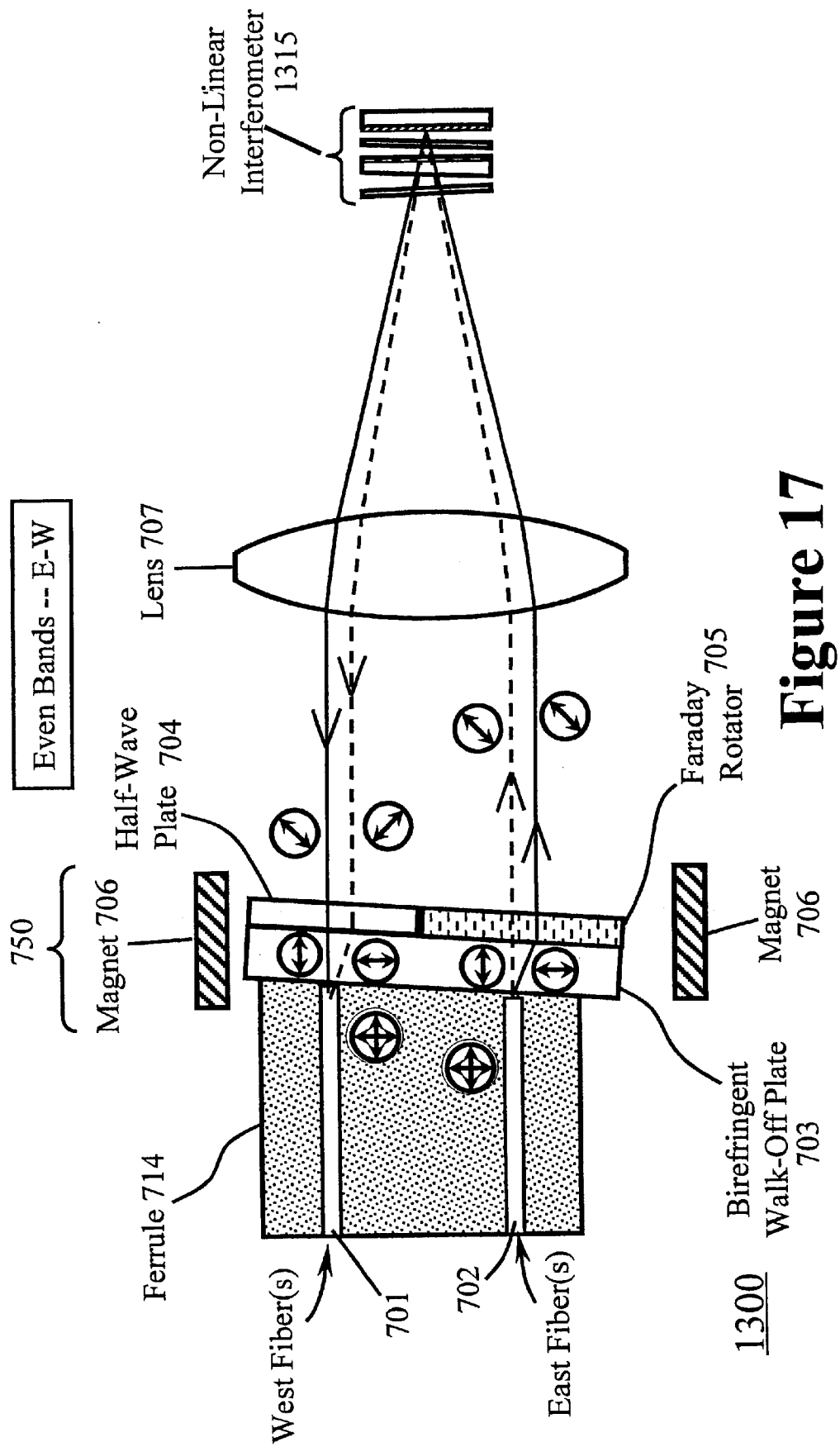
FIG. 17 is a side view of the embodiment of a single-stage interleaved bi-directional polarization independent optical isolator of the present invention showing central ray paths for light signals of the even (westbound) channels propagating east-to-west and corresponding to each of the two principal polarization directions.
Figure 18:
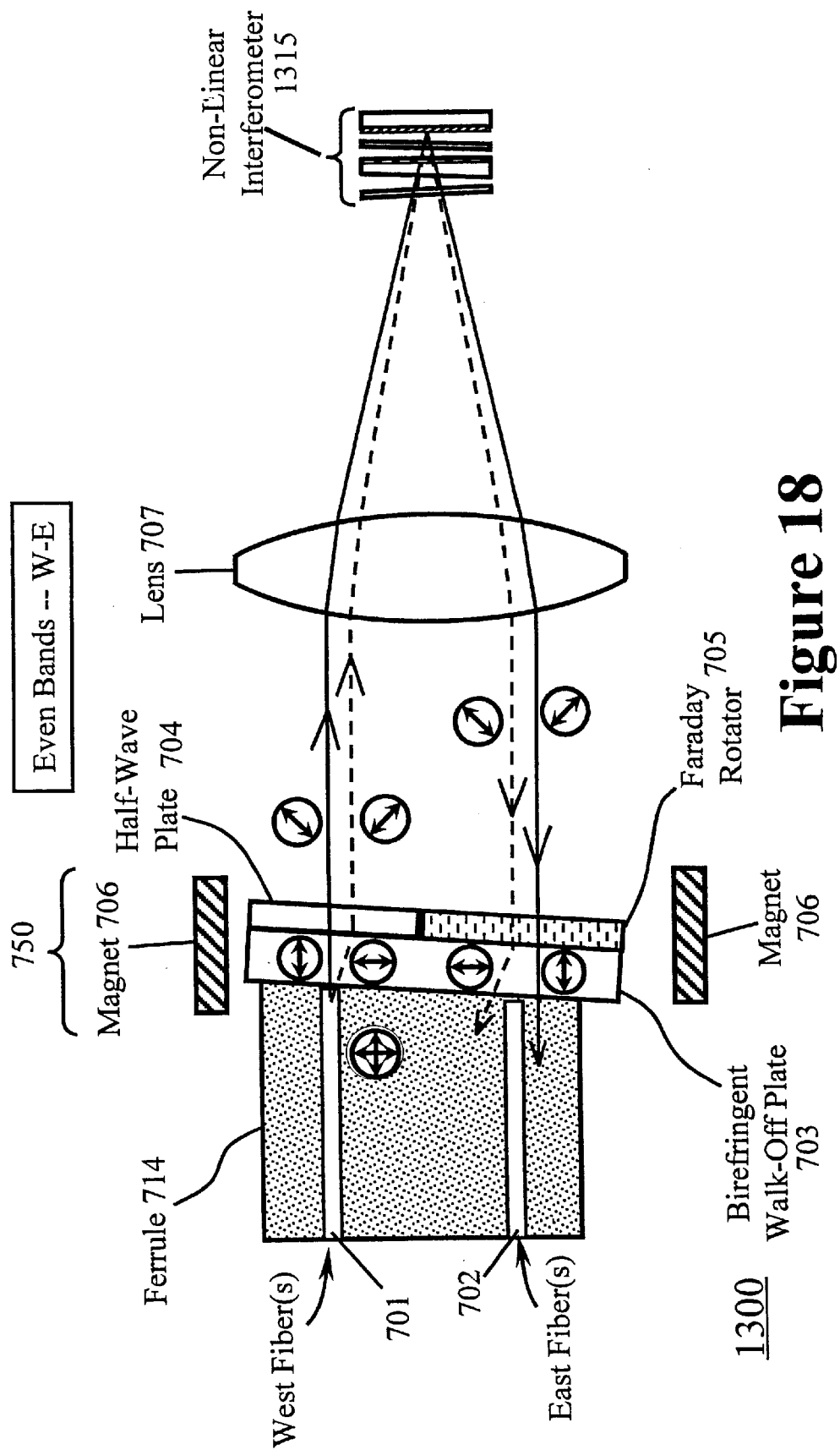
FIG. 18 is a side view of the embodiment of a single-stage interleaved bi-directional polarization independent optical isolator of the present invention showing central ray paths for light signals of the even (westbound) channels propagating west-to-east and corresponding to each of the two principal polarization directions.

FIG. 15 and FIG. 16 illustrate the paths and polarization states of representative light rays of the first band set 401 in the west-to-east, or forward direction, and east-to-west, or reverse direction, respectively. Likewise, FIG. 17 and FIG. 18 illustrate the paths and polarization states of representative light rays of the second band set 402 in the east-to-west, or forward direction, and west-to-east, or reverse direction, respectively.

The principal of operation of the interleaved bi-directional optical isolator 1300 of the present invention illustrated in FIGS. 15–18 is similar to that of the band bi-directional isolator 700 of the present invention illustrated in FIGS. 9–12 and is not repeated in detail here. That is, except for the nature of reflection at either the mirror/waveplate assembly 708 or the non-linear interferometer 1315, the signal light ray paths and polarization directions of the light of the first band set 401 and of the second band set 402 during transit through the interleaved bi-directional isolator 1300 of the present invention are similar to those of the light of the "red" band and "blue" band, respectively during transit through the band bi-directional isolator 700 of the present invention.

That is, plane polarized signal light of the "red" band is reflected by mirror/waveplate assembly 708 without a rotation by the mirror/waveplate assembly 708 of the plane of polarization of this light. Likewise, plane polarized signal light of the first band set 401 is reflected by the non-linear interferometer 1315 without a rotation by the non-linear interferometer 1315 of the plane of polarization of this light.

On the other hand, plane polarized light of the "blue" band is reflected by mirror/waveplate assembly 708 with a rotation by 90° of the plane of polarization of this light. Likewise, plane polarized light of the second band set 402 is reflected by the non-linear interferometer 1315 with a 90° rotation of the plane of polarization of this light.

Thus, as already described for the red band, when propagating in the west-to-east direction, the two sub-signal light rays of the first band set 401 each experience a change in character—from e-ray to o-ray or from o-ray to e-ray, respectively—between their two passes through the birefringent element 703 and this change causes a recombination of these two sub-signals so as to enter the East fiber 702. This is shown in FIG. 15.

Also, as already described for the red band, when propagating in the east-to-west direction, the two sub-signal light rays of the first band set 401 each experience no change in e-ray or o-ray character between their two passes through the birefringent element 703 and therefore neither recombine nor enter the West fiber 701. This is shown in FIG. 16.

Furthermore, as already described for the blue band, when propagating in the east-to-west direction, the two sub-signal light rays of the second band set 402 each experience a change in character—from e-ray to o-ray or from o-ray to e-ray, respectively—between their two passes through the birefringent element 703 and this change causes a recombination of these two sub-signals so as to enter the West fiber 701. This is shown in FIG. 17.

Also, as already described for the blue band, when propagating in the west-to-east direction, the two sub-signal light rays of the second band set 402 each experience no change in e-ray or o-ray character between their two passes through the birefringent element 703 and therefore neither recombine nor enter the East fiber 702. This is shown in FIG. 18.

The disparate effect upon light of the second band set 402 as compared to light of the first band set 401 in the interleaved bi-directional isolator 1300 is caused by the non-linear interferometer 1315 which rotates the polarization plane of the plane polarized light of the sub-signals of the band set 402 by 90° while leaving unchanged the polarization plane of the plane polarized light of sub-signals of the band set 401. It is this disparate effect, combined with the effect of elements 703–707, which allows the band set 401 to pass through the isolator 1300 in the west-to-east direction while preventing the band set 402 from passing therethrough in the west-to-east direction, and allows the band set 402 to pass through the isolator 1300 in the east-to-west direction while preventing the band set 401 from passing therethrough in the east-to-west direction.

As illustrated in FIGS. 15–18, such polarization-plane rotation at nonlinear interferometer 1315 is required so as to permit east-to-west propagation of signals through isolator 1300 and the absence of such rotation is required so as to permit west-to-east propagation of signals through isolator 1300. In this fashion, the isolator 1300 performs the function of an interleaved bi-directional optical isolator permitting passage of light of the first interleaved set 401 of bands only in the eastbound direction and passage of light of the second interleaved set 402 of bands only in the westbound direction.

Figure 19:
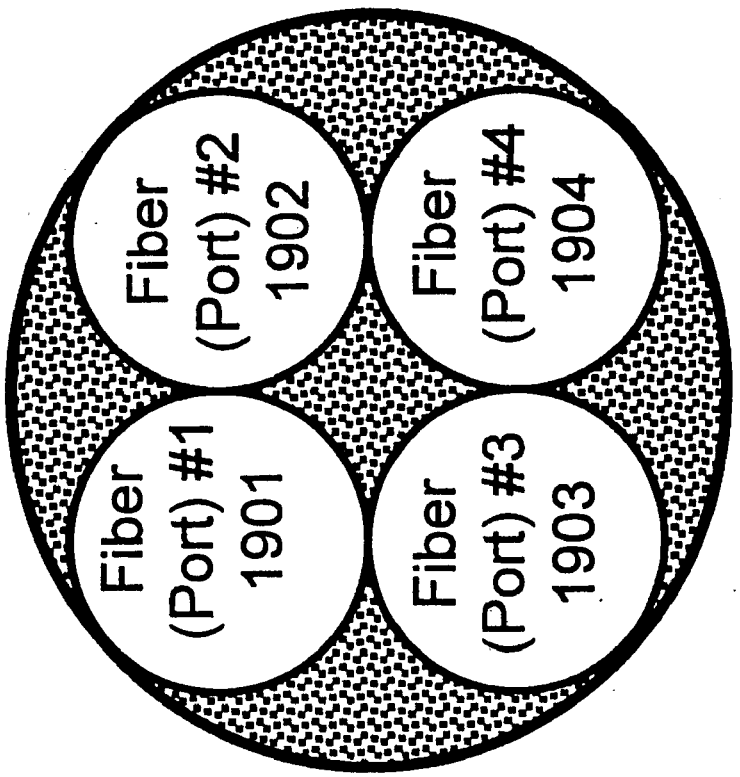
FIG. 19 is an end view of the fiber (port) configuration within the front four-fiber ferrule of the two embodiments of the twin single-stage bi-directional optical isolator and the two embodiments of the double-stage bi-directional optical isolator of the present invention.

FIG. 19 illustrates a cross-sectional view of the optical fiber configuration in the ferrule 714 of the first embodiment of the bi-directional optical isolator 700 and the second embodiment of the bi-directional optical isolator 1300 of the present invention in the case where this ferrule 714 comprises a four-fiber ferrule. In the discussions pertaining to light signal passes through isolators of any of the embodiments of the present invention, Fiber (Port) #1 1901 and Fiber (Port) #2 1902 are assumed to be logical West-side fibers whereas Fiber (Port) #3 1903 and Fiber (Port) #4 1904 are assumed to be logical East-side fibers.

Because of the well-known inversion characteristics of lenses, such as lens 707, light inputted to the isolator at fiber (port) #1 1901 emerges from the isolator adjacent to fiber #4 1904 and is outputted to fiber #4 1904 and vice versa. Likewise, light inputted to the isolator at fiber #2 1902 emerges from the isolator adjacent to fiber #3 1903 and is outputted to fiber #3 1903 and vice versa.

In the case where the ferrule 714 comprises a four-fiber ferrule, then one pair of fibers in the four-fiber ferrule 714 remains unutilized in both of the first and second embodiments of the bi-directional polarization independent optical isolator of the present invention described above. In the third and fourth embodiments of the bi-directional polarization independent optical isolator of the present invention (not separately drawn, but drawn as explained herein below) which are hereinafter referred to, respectively, as the twin band bi-directional polarization independent optical isolator and the twin interleaved bi-directional polarization independent optical isolator, ferrule 714 does indeed comprise a four-fiber ferrule and both pairs of optical fibers in the four-fiber ferrule are used simultaneously and independently.

More particularly, in both the third and fourth embodiments of the present invention, one pair of fibers (for example, fiber #1 and fiber #4) in the four-fiber ferrule 714 is used as input to and output from the isolator for one bi-directional optical fiber transmission line and the other pair of fibers (for example, fiber #2 and fiber #3) is used for input to and output from the isolator for a second independent bi-directional optical fiber transmission line. As shown in FIG. 19, since both input fibers #1 and #2 are arranged beside each other and both output fibers #3 and #4 are arranged beside each other in the ferrule 714, the side view of the third embodiment of the present invention is similar to the side view of the first embodiment shown in FIGS. 9–12, and the side view of the fourth embodiment is similar to the side view of the second embodiment shown in FIGS. 15–18.

Therefore, the third embodiment of the present invention (the twin band bi-directional polarization independent optical isolator) operates similarly to the first embodiment of the present invention (the band bi-directional polarization independent optical isolator 700) but includes multiple pairs of input and output fibers which pairs operate independently of each other. The operation of each pair of the multiple pairs of input and output fibers of the third embodiment of the present invention is consistent with the operation of the first embodiment of the present invention explained with reference to FIGS. 9–12.

Likewise, the fourth embodiment of the present invention (the twin interleaved bi-directional polarization independent optical isolator) is similar to the second embodiment of the present invention (the interleaved bi-directional polarization independent optical isolator 1300) but includes multiple pairs of input and output fibers which pairs operate independently of each other. The operation of each pair of the multiple pairs of input and output fibers of the fourth embodiment of the present invention is consistent with the operation of the second embodiment of the present invention explained with reference to FIGS. 13–18.

The third and fourth embodiments of the present invention have the advantage of ease of alignment of the fibers. More particularly, because the relative positions of the fibers are tightly constrained by the geometrical arrangement within the ferrule (FIG. 19), when one pair of fibers—either fiber #1 and fiber #4 or fiber #2 and fiber #3—is properly aligned, the other pair is also aligned without further effort.

Figure 20:
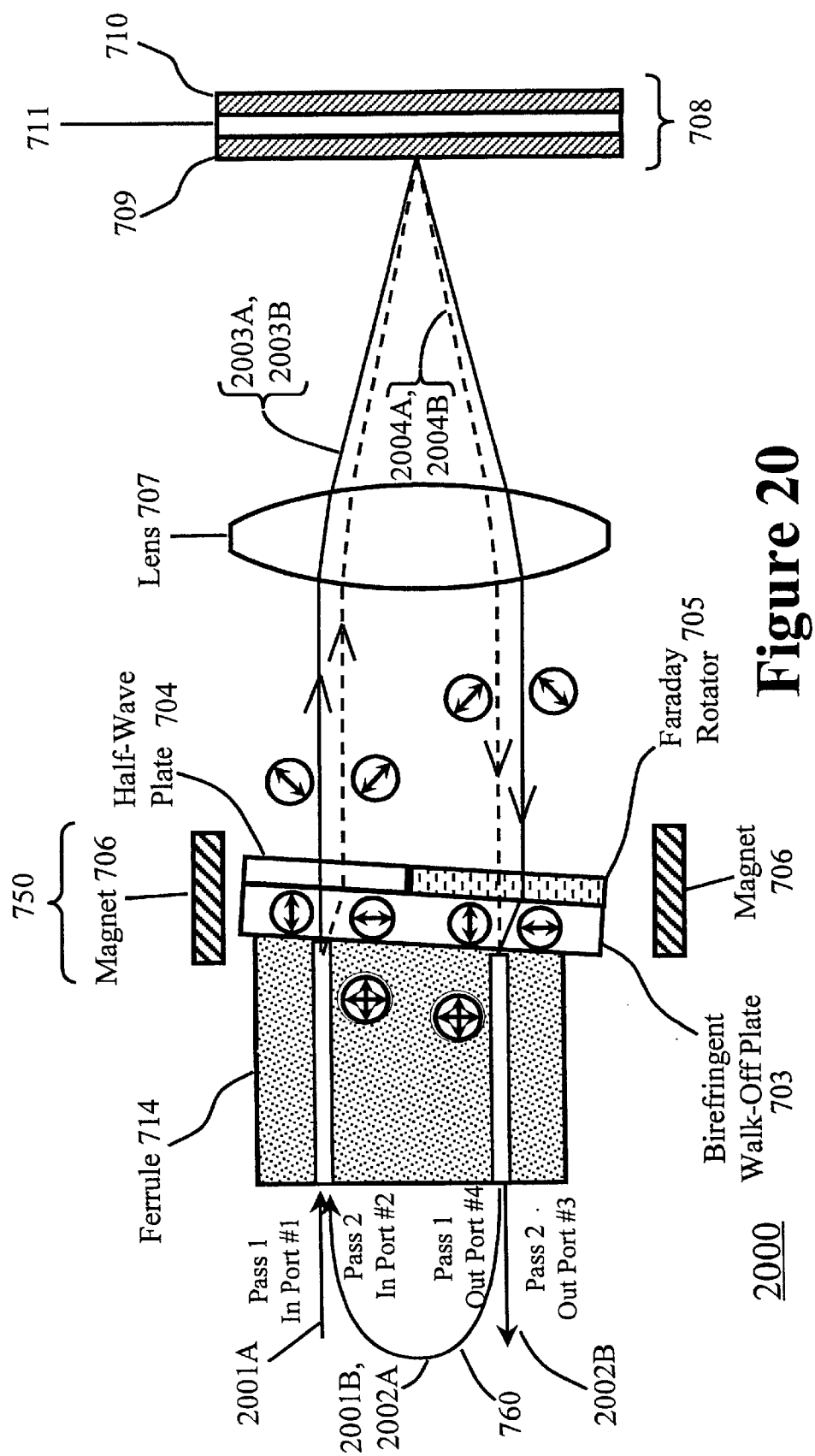
FIG. 20 is a side view of an embodiment of a double-stage band bi-directional polarization independent optical isolator of the present invention showing central ray paths for light signals of the red (eastbound) band propagating west-to-east and corresponding to each of the two principal polarization directions.
Figure 21:
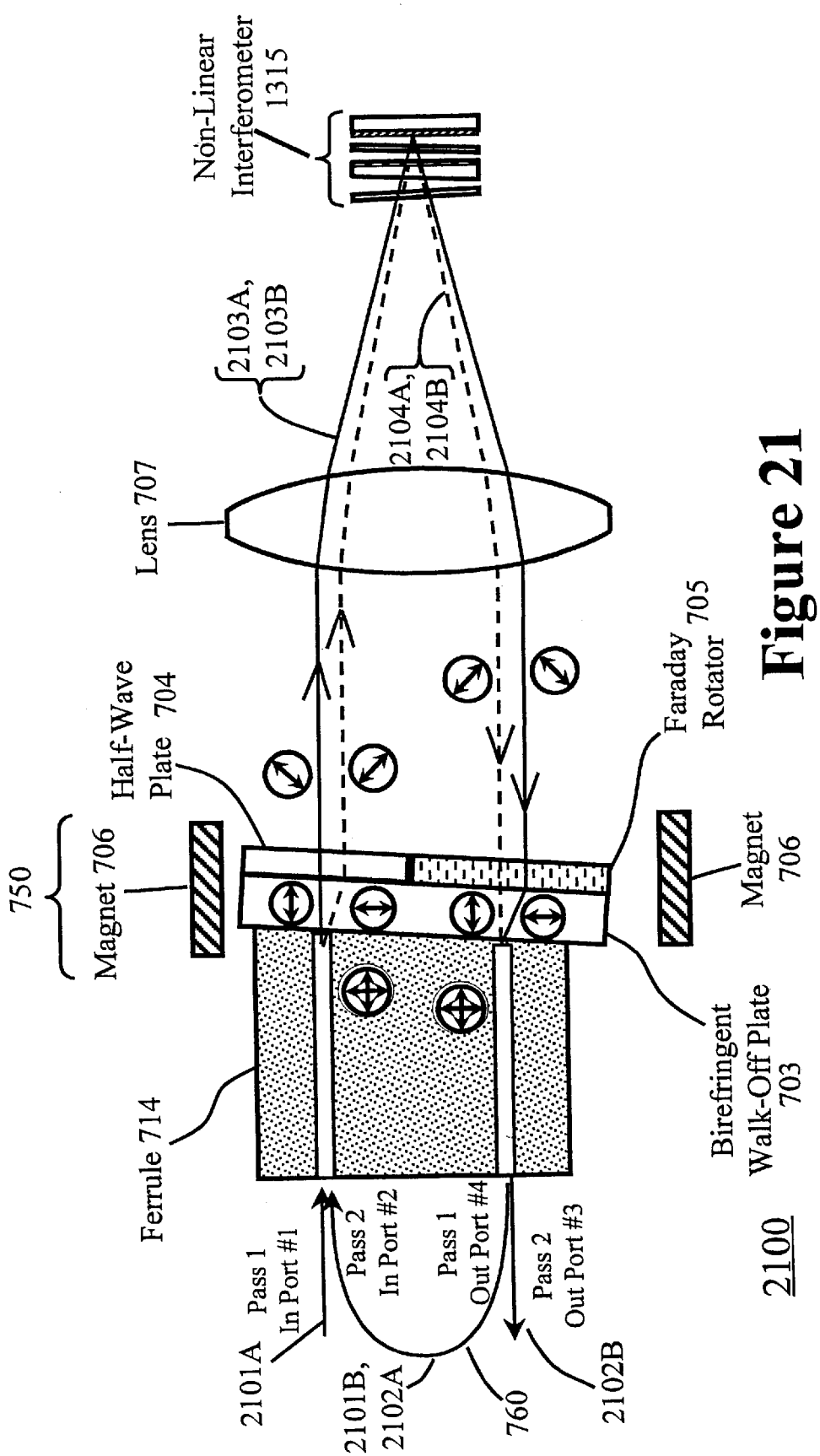
FIG. 21 is a side view of an embodiment of a double-stage interleaved bi-directional polarization independent optical isolator of the present invention showing central ray paths for light signals of the odd (eastbound) channels propagating west-to-east and corresponding to each of the two principal polarization directions.

Instead of the use of pairs of fibers (ports) in parallel for two independent signal transmission lines as in the third and fourth embodiments of the bi-directional polarization independent optical isolator of the present invention, the two pairs of fibers in the four-fiber ferrule 714 may be employed sequentially for a single signal transmission line as shown in FIGS. 20 and 21 which illustrate, respectively, the fifth and sixth embodiments of the present invention.

The fifth embodiment of the present invention, as shown in FIG. 20, is herein referred to as a double-stage band bi-directional polarization independent optical isolator 2000, and the sixth embodiment, as shown in FIG. 21, is herein referred to as a double-stage interleaved bi-directional polarization independent optical isolator 2100.

In both the fifth and sixth embodiments of the present invention, the output (input) of one pair of optical fibers within the four-fiber ferrule 714 is optically coupled to the input (output) of the other pair of optical fibers. The optical coupling between the two pairs of fibers is designed such that the polarization-plane orientation of each of the two sub-signals of each signal propagating through the isolator is preserved between output from one pair of fibers and input to the second pair of fibers. This polarization-preserving optical coupling 760 may be accomplished by any one of a number of optical devices such as a pair of mirrors, a retro-reflecting prism, a polarization-maintaining optical fiber, or the like. Through such coupling, each signal light beam—each of which comprises two sub-signal light beams with mutually perpendicular planes of linear polarization—is made to pass twice through the optical isolator of the present invention, as illustrated schematically by the pathways drawn in FIG. 20 and FIG. 21.

In FIG. 20, reference numerals 2001A and 2001B refer to Fiber (Port) #1 1901 and Fiber (Port) #2 1902, respectively, whereas reference numerals 2002B and 2002A refer to Fiber (Port) #3 1903 and Fiber (Port) #4 1904, respectively. Likewise, In FIG. 21, reference numerals 2101A and 2101B refer to Fiber (Port) #1 1901 and Fiber (Port) #2 1902, respectively whereas reference numerals 2102B and 2102A refer to Fiber (Port) #3 1903 and Fiber (Port) #4 1904, respectively.

In both FIG. 20 and FIG. 21, the depiction of Fiber #1 1901, which is equivalent to either fiber 2001A or fiber 2101A, overlaps with that of Fiber #2 1902, which is equivalent to either fiber 2001B or 2101B. Likewise, in both FIG. 20 and FIG. 21, the depiction of Fiber #3 1903, which is equivalent to either fiber 2002B or fiber 2102B, overlaps with that of Fiber #4 1904, which is equivalent to either fiber 2002A or fiber 2102A. The reasons for these overlaps are because FIG. 20 and FIG. 21 are two-dimensional side view representations of isolator 2000 and isolator 2100, respectively, of the present invention. For this same reason, the pairs of reference numerals 2003A and 2003B, 2004A and 2004B, 2103A and 2103B, and 2104A and 2104B are pairs of overlapping depictions of sub-signal sub-paths as is described in more detail below.

Each of the double-stage isolator embodiments of the present invention, isolator 2000 (FIG. 20) and isolator 2100 (FIG. 21), achieves its double-stage isolation characteristics through two consecutive passes through the respective isolator, with the output of the first pass optically coupled to the input of the second pass in a polarization preserving manner as described above. The only difference between the double-stage band bi-directional polarization independent optical isolator 2000 (FIG. 20), and the double-stage interleaved bi-directional polarization independent optical isolator 2100 (FIG. 21) is the substitution of the non-linear interferometer 1315 in isolator 2100 for the mirror/waveplate assembly 708 in isolator 2000.

During each pass of a light-ray signal through either isolator 2000 or isolator 2100 of the present invention, the sub-signal ray paths and polarization states thereof are identical to those of isolator 700 and isolator 1300, respectively, of the present invention and are not repeated in detail here.

However, each light signal passes twice through isolator 2000 or isolator 2100 with each such pass involving a pair of diagonally opposed fibers—either Fiber #1 and Fiber #4 or Fiber #2 and Fiber #3—in the four-fiber ferrule 714 as shown in FIG. 19. Thus, for instance, if Fiber #1 1901 is the input of a first pass of an eastbound signal through either isolator 2000 or isolator 2100, then Fiber #4 1904 is the output for that first pass, and, because of optical coupling between the two passes, Fiber #2 will be the input and Fiber #3 will be the output for the second pass of the same signal through the isolator.

Because both isolator 2000 and isolator 2100 of the present invention are bi-directional isolators, there is also the provision for propagation of westbound signals through both. Thus, continuing the example of the previous paragraph, for westbound light signals propagating through either isolator 2000 or 2100, Fiber #3 1903 and Fiber #2 1902 are the input and output, respectively, of the first pass, and Fiber #4 1904 and Fiber #1 1901 are the input and output, respectively, of the second pass through the respective isolator. Thus, in this example, Fiber #2 1902 and Fiber #4 1904 are optically coupled to each other.

As discussed above, for each pass of a light signal through any of the embodiments of the bi-directional polarization-independent optical isolator of the present invention, two physically separate sub-signals are generated by the birefringent walk-off effect—a first sub-signal which propagates as a horizontally polarized o-ray during its first transit through birefringent element 703 after entering the isolator and a second sub-signal which propagates as a vertically polarized e-ray during its first transit through birefringent element 703 after entering the isolator.

Because each signal makes two passes through isolator 2000 (FIG. 20) and isolator 2100 (FIG. 21) of the present invention and, for each pass, two sub-signals exist, four separate sub-signal pathway segments exist in the isolator during the passage of a signal through either isolator 2000 or isolator 2100. These four sub-signal pathway segments are denoted by reference numerals 2003A, 2003B, 2004A, and 2004B in FIG. 20 and by 2103A, 2103B, 2104A, and 2104B in FIG. 21.

In isolator 2000 (FIG. 20), reference numerals 2003A and 2004A represent the first and second sub-signals of the first pass through the isolator 2000 and reference numerals 2003B and 2004B represent the first and second sub-signals of the second pass through the isolator 2000.

Likewise, in isolator 2100 (FIG. 21), reference numerals 2103A and 2104A represent the first and second sub-signals of the first pass through the isolator 2100 and reference numerals 2103B and 2104B represent the first and second sub-signals of the second pass through the isolator 2100. As discussed previously, the depictions of the first and second passes through the isolator 2000 and through the isolator 2100 overlap with each other in the two-dimensional representations of FIG. 20 and FIG. 21, respectively.

The complete path of an optical signal through the isolator 2000 will now be discussed with reference to FIG. 20. For illustrative purposes, the following discussion only involves the forward propagation of the eastbound signal in the double-stage band bi-directional polarization independent optical isolator 2000 of the present invention. Reverse propagation—that is, propagation of any signal in its undesired direction—is similar to that already discussed in previous embodiments of the present invention. Propagation of a westbound signal is similar to that already discussed except for the provision of a second pass through the isolator 2000 as discussed below. Furthermore propagation through the double-stage interleaved bi-directional polarization independent optical isolator 2100 is similar to propagation through the double-stage band bi-directional polarization independent optical isolator 2000 and is not separately discussed. The relationship between the light ray signals traveling through isolator 2000 ("red" and "blue" bands) and isolator 2100 (first interleaved set 401 and second interleaved set 402 of bands) is similar to the relationship between light ray signals traveling through isolator 700 ("red" and "blue" bands) and isolator 1300 (first interleaved set 401 and second interleaved set 402 of bands) explained herein above.

It is assumed that the eastbound signal comprises the "red" band of a band bi-directional lightwave communications system which includes isolator 2000 of the present invention. It is also assumed that fibers (or ports) 2001A and 2001B are on the logical West side of isolator 2000 and that fibers (or ports) 2002A and 2002B are on the logical East side of isolator 2000. Thus, for signal light of the red band, fibers (ports) 2001A and 2002A are, respectively, the input and output for the first pass and fibers (ports) 2001B and 2002B are, respectively, the input and output for the second pass.

In FIG. 20, unpolarized signal light of the red band entering isolator 2000 for the first time from the fiber 2001A first passes through the birefringent walk-off plate 703. Upon passing through element 703, this signal light is split into sub-signals, 2003A and 2004A. The principal optical axes of birefringent walk-off plate 703 are aligned such that sub-signal 2003A propagates therethrough as a horizontally-polarized ordinary ray (o-ray) and is not deflected while sub-signal 2004A propagates therethrough as a vertically-polarized extraordinary ray (e-ray) and is deflected by the well-known birefringence walk-off effect. Therefore, as discussed above, in the first pass of a red-band signal through isolator 2000, sub-signal 2003A is a first sub-signal and sub-signal 2004A is a second sub-signal.

After passing through element 703, both of the sub-signals 2003A and 2004A enter the λ/2 (half-wave) plate 704. The half-wave plate 704 reciprocally rotates the direction of the plane of polarization of each of the sub-signals 2003A and 2004A by 45° in a counterclockwise direction. After passage through the half-wave plate 704, both sub-signals 2003A and 2004A pass through lens 707 which directs them to the mirror/waveplate assembly 708.

Because of the reflectivity characteristics of the red reflector 709 as illustrated in FIG. 8, 100% of the red signal light is reflected back towards the lens 707.

The signal light that is reflected back to and through lens 707 is then directed by that lens to the Faraday rotator 705. The Faraday rotator 705, in response to a magnetic field applied by magnets 706, non-reciprocally rotates the polarization of both sub-signals 2003A and 2004A by 45° in a counterclockwise direction.

After passing through the Faraday rotator 705, both sub-signals 2003A and 2004A re-enter the birefringent walk-off plate 703 such that sub-signal 2003A is vertically polarized and sub-signal 2004A is horizontally polarized. Sub-signal 2003A therefore propagates, in its second transmission through the birefringent walk-off plate 703 of the first pass through the isolator 2000, as an e-ray and is deflected by an amount equal and opposite to the original deflection of sub-signal 2004A during the first transmission through element 703 within the first pass through the isolator. Furthermore, sub-signal 2004A propagates through element 703 as an o-ray and is not deflected. Because of these switches in o- and e-character for sub-signals 2003A and 2004A upon re-entering element 703 for the second time during the first pass through the isolator 2000, their deflections in the birefringent walk-off element 703 are cancelled and the two sub-signals 2003A and 2004A are caused to overlap so as to be transmitted through fiber (port) 2002A.

The output fiber (port #4) 2002A of the first pass through isolator 2000 is optically coupled, in a polarization preserving manner, to the input fiber (port #2) 2001B of the second pass through isolator 2000. As discussed above, this coupling may be accomplished through the use of a polarization maintaining fiber, a pair of mirrors, a retro-reflecting prism, or the like.

Because polarization is maintained during this coupling, the two plane polarized sub-signals 2003A and 2004A maintain their separate identities and do not re-combine into a single unpolarized signal after output from the first pass through isolator 2000. In fact, since polarization is maintained, the sub-signal 2003A, which is vertically polarized after output from the first pass through isolator 2000, becomes the vertically polarized sub-signal 2004B during its second pass through isolator 2000. Similarly, the sub-signal 2004A, which is horizontally polarized after output from the first pass through isolator 2000, becomes the horizontally polarized sub-signal 2003B during its second pass through isolator 2000. Since sub-signals 2003A and 2003B are first sub-signals whereas sub-signals 2004A and 2004B are second sub-signals, the light which comprises any sub-signal behaves as both a first sub-signal and a second sub-signal during its two passes through isolator 2000.

After inter-pass (from the first pass to the second pass) coupling, the fiber (port #2) 2001B serves as input for the second pass of signal light of the red band through isolator 2000 (FIG. 20).

After entering isolator 2000 for a second time, the two sub-signals 2003B and 2004B, pass through the birefringent walk-off plate 703. The light comprising first sub-signal 2003B during the second pass through isolator 2000 originally comprised second sub-signal 2004A during the first pass through isolator 2000. Also, the light comprising second sub-signal 2004B during the second pass through isolator 2000 originally comprised first sub-signal 2003A during the first pass through isolator 2000.

Upon passing through element 703, the two sub-signals, 2003B and 2004B are physically separated, into a not deflected ordinary ray (o-ray) and a deflected extraordinary ray (e-ray), respectively. Therefore, in the second pass of a red-band signal through isolator 2000, sub-signal 2003B is a first sub-signal and sub-signal 2004B is a second sub-signal.

After passing through element 703, both of the sub-signals 2003B and 2004B enter the λ/2 (half-wave) plate 704. The half-wave plate 704 reciprocally rotates the direction of the plane of polarization of each of the sub-signals 2003B and 2004B by 45° in a counterclockwise direction.

After passage through the half-wave plate 704, both sub-signals 2003B and 2004B pass through lens 707 which directs them to the mirror/waveplate assembly 708.

Because of the reflectivity characteristics of the red reflector as illustrated in FIG. 8, 100% of the red signal light is reflected back towards the lens 707.

The signal light that is reflected back to and through lens 707 is then directed by that lens 707 to the Faraday rotator 705.

The Faraday rotator 705, in response to a magnetic field applied by magnets 706, non-reciprocally rotates the polarization of both sub-signals 2003B and 2004B by 45° in a counterclockwise direction.

After passing through the Faraday rotator 705, both sub-signals 2003B and 2004B re-enter the birefringent walk-off plate 703 such that sub-signal 2003B is vertically polarized and sub-signal 2004B is horizontally polarized.

Sub-signal 2003B therefore propagates, in its second transmission through the birefringent walk-off plate 703 of the second pass through the isolator, as an e-ray and is deflected by an amount equal and opposite to the deflection of sub-signal 2004B during the first transmission through element 703 within the second pass through the isolator.

Furthermore, sub-signal 2004B propagates through element 703 as an o-ray and is not deflected.

Because of these switches in o- and e-character for sub-signals 2003B and 2004B upon re-entering element 703 for the second time during the second pass through the isolator 2000, their deflections in the birefringent walk-off element 703 are cancelled and the two sub-signals 2003B and 2004B recombine so as to exit isolator 2000 through fiber (port #3) 2002B.

Isolator 2100 of the present invention shown in FIG. 21 functions logically similarly to isolator 2000 of the present invention shown in FIG. 20, except that first interleaved set 401 and second interleaved set 402 of bands in isolator 2100 respectively replace the "red" and "blue" bands in isolator 2000. As such, the traversal of signal 2103A through isolator 2100 is similar to that of signal 2003A of isolator 2000, and the same is true for signals 2103B and 2003B, 2104A and 2004A, and 2104B and 2004B.

The double stage polarization independent bi-directional optical isolators, isolator 2000 and isolator 2100, have the advantage relative to the single stage isolators, for instance isolator 700 and isolator 1300 as well as many prior-art isolators, of freedom from Polarization Mode Dispersion (PMD). Polarization Mode Dispersion is the phenomenon by which differently polarized components, or sub-signals, comprising an optical signal propagate with different speeds. This duality of speeds can cause unacceptable broadening of the digital pulses comprising a signal. Such pulse broadening may, in turn, cause digital reception errors at the receiver end of an optical communications system. The maximum acceptable level of PMD broadening, in time units, between transmitter and receiver is generally taken as equivalent to one-tenth the width of a digital light pulse. For example, for data transmission rates corresponding to the OC-192 standard, where nominal pulse widths are on the order of 100 pico-seconds, the maximum acceptable level of pulse broadening is on the order of 10 pico-seconds. This translates into a total maximum optical path length difference between sub-signal components of approximately 3 mm between transmitter and receiver, a distance that may encompass many hundreds of kilometers. Different data transmission rates will correspond to different maximum optical path length differences, accordingly.

The maximum acceptable PMD-induced optical path length difference is the cumulative result of all PMD effects in all the optical elements through which a signal propagates, including fiber and non-fiber optical components. Although the PMD broadening of optical fiber increases as the square root of fiber length, the PMD broadening caused by birefringent components is linearly related to the cumulative optical path difference of all such components. Thus, if any PMD effects are produced by non-fiber optical components, either the number of such components, the PMD effect per component, or the data transmission rate must be limited so as to derive acceptable data transmission performance.

The most suitable option is for all components to be PMD-free. However, as may readily be seen by inspection of FIGS. 9–12 or FIGS. 15–18, the two sub-signal components, such as for instance sub-signal 902 and 903 of FIG. 9, may traverse different physical and optical path lengths within isolator 700, isolator 1300, the twin band bi-directional isolator and the twin interleaved bi-directional isolator. This difference in optical path lengths may cause PMD problems in some situations. However, it is readily seen by inspection of FIG. 20 and FIG. 21 that the two linearly polarized component sub-signals traverse identical physical and optical path lengths in the double stage bi-directional isolators, isolator 2000 and isolator 2100. This is because, during the two traverses of a signal through each of the double-stage isolators, both linearly polarized light sub-signal components thereof are both a first sub-signal and a second sub-signal. Furthermore, because optical coupling between these two traverses is made in a polarization maintaining fashion, there is no mixing or crossover of such linearly polarized sub-signals components one to another. Thus, between the two traverses through isolator 2000 or 2100, the path lengths of both such sub-signals are identical and PMD effects are eliminated.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus comprising:
a bi-directional polarization-independent isolator transmitting therethrough input light including first wavelengths received from a first optical port to a second optical port while preventing transmission therethrough of input light of the first wavelengths received from the second optical port to the first optical port, and, simultaneously, transmitting therethrough input light of second wavelengths different than the first wavelengths and received from the second optical port to the first optical port while preventing transmission therethrough of input light of the second wavelengths received from the first optical port to the second optical port, said bi-directional polarization-independent isolator dividing the input light into components, and recombining the components into output light transmitted to one of the first optical port and the second optical port and such recombining based upon whether the components are changed in character by the bi-directional polarization-independent isolator, wherein the bi-directional polarization-independent isolator comprises:
a bi-directional polarization independent optical element dividing the input light into the components and selectively recombining the components based upon the plane of polarization of the components;
a reflector reflecting therefrom the components of the input light incident on the reflector after selectively changing the plane of polarization of the components of the input light incident thereon based upon the wavelength of the components of the input light incident thereon; and
at least one lens collimating and directing the components of the input light onto the reflector and focusing and directing the reflected components of the input light onto an output port including the one of the first optical port and the second optical port, wherein the reflector comprises a mirror/waveplate assembly wherein only the input light having the second wavelengths passes through the waveplate portion of the mirror/waveplate assembly.

2. The apparatus according to claim 1, wherein the bi-directional polarization-independent isolator is a band bi-directional polarization-independent isolator, and wherein the first wavelengths are included in a first band of wavelengths and the second wavelengths are included in a second band of wavelengths.

3. An apparatus comprising:
a bi-directional polarization-independent isolator transmitting therethrough input light including first wavelengths received from a first optical port to a second optical port while preventing transmission therethrough of input light of the first wavelengths received from the second optical port to the first optical port, and transmitting therethrough input light of second wavelengths different than the first wavelengths and received from the second optical port to the first optical port while preventing transmission therethrough of input light of the second wavelengths received from the first optical port to the second optical port, said bi-directional polarization-independent isolator dividing the input light into components, and recombining the components into output light transmitted to one of the first optical port and the second optical port and such recombining based upon whether the components are changed in character by the bi-directional polarization-independent isolator, said bi-directional polarization-independent isolator comprising:
  a bi-directional polarization independent optical element dividing the input light into the components and selectively recombining the components based upon the plane of polarization of the components;
  a reflector reflecting therefrom the components of the input light incident on the reflector after selectively changing the plane of polarization of the components of the input light incident thereon based upon the wavelength of the components of the input light incident thereon, wherein the reflector comprises a mirror/waveplate assembly selectively changing the plane of polarization of the components included in the input light having the second wavelengths; and
  at least one lens collimating and directing the components of the input light onto the reflector and focusing and directing the reflected components of the input light onto an output port including the one of the first optical port and the second optical port, wherein the mirror/waveplate assembly comprises:
    a first reflector reflecting the components of the input light having the first wavelengths,
    a quarter-wave plate adjacent to the first reflector and rotating the plane of polarization of the components having the second wavelengths and passing therethrough, and
    a second reflector adjacent to the quarter-wave plate and reflecting the components of the input light having the second wavelengths.

4. An apparatus comprising:
a bi-directional polarization-independent isolator transmitting therethrough input light including first wavelengths received from a first optical port to a second optical port while preventing transmission therethrough of input light of the first wavelengths received from the second optical port to the first optical port, and transmitting therethrough input light of second wavelengths different than the first wavelengths and received from the second optical port to the first optical port while preventing transmission therethrough of input light of the second wavelengths received from the first optical port to the second optical port, said bi-directional polarization-independent isolator dividing the input light into components, and recombining the components into output light transmitted to one of the first optical port and the second optical port and such recombining based upon whether the components are changed in character by the bi-directional polarization-independent isolator, said bi-directional polarization-independent isolator comprising:
  a bi-directional polarization independent optical element dividing the input light into the components and selectively recombining the components based upon the plane of polarization of the components;
  a reflector reflecting therefrom the components of the input light incident on the reflector after selectively changing the plane of polarization of the components of the input light incident thereon based upon the wavelength of the components of the input light incident thereon; and
  at least one lens collimating and directing the components of the input light onto the reflector and focusing and directing the reflected components of the input light onto an output port including the one of the first optical port and the second optical port, wherein the reflector comprises a non-linear interferometer selectively changing the plane of polarization of the components included in the input light having the second wavelengths.

5. The apparatus according to claim 4 wherein the bi-directional polarization-independent isolator is an interleaved bi-directional polarization-independent isolator, and wherein the input light is divided into first channels including the input light having the first wavelengths, and second channels including the input light having the second wavelengths, and the first and second channels are interleaved with each other.

6. An apparatus comprising:
a bi-directional polarization-independent isolator transmitting therethrough input light including first wavelengths received from a first optical port to a second optical port while preventing transmission therethrough of input light of the first wavelengths received from the second optical port to the first optical port, and transmitting therethrough input light of second wavelengths different than the first wavelengths and received from the second optical port to the first optical port while preventing transmission therethrough of input light of the second wavelengths received from the first optical port to the second optical port, said bi-directional polarization-independent isolator dividing the input light into components, and recombining the components into output light transmitted to one of the first optical port and the second optical port and such recombining based upon whether the components are changed in character by the bi-directional polarization-independent isolator, said bi-directional polarization-independent isolator comprising:
  a bi-directional polarization independent optical element dividing the input light into the components and selectively recombining the components based upon the plane of polarization of the components;
  a reflector reflecting therefrom the components of the input light incident on the reflector after selectively changing the plane of polarization of the components of the input light incident thereon based upon the wavelength of the components of the input light incident thereon; and
  at least one lens collimating and directing the components of the input light onto the reflector and focusing and directing the reflected components of the input light onto an output port including the one of the first optical port and the second optical port, wherein the bi-directional polarization independent optical element comprises:
    a birefringent walk-off plate dividing the input light into the components including an ordinary ray component and an extraordinary ray component and displacing the extraordinary ray component away from the ordinary ray component, and recombining the components reflected by the reflector if the ordinary ray component of the input light is changed to an extraordinary ray component of the reflected components and the extraordinary ray component of the input light is changed to an ordinary ray component of the reflected components during transmission through the bi-directional polarization-independent isolator,
    a reciprocal optical rotator adjacent to the birefringent walk-off plate reciprocally rotating the plane of polarization of the components having the first wavelengths and the second wavelengths passing therethrough by 45° in a first direction, and a Faraday rotator, said Faraday rotator adjacent to the birefringent walk-off plate and the reciprocal optical rotator and non-reciprocally rotating the plane of polarization of the components having the first wavelengths and the second wavelengths passing therethrough by 45° in the first direction.

7. A band bi-directional polarization-independent optical isolator receiving from a first optical port input light having first wavelengths and input light having second wavelengths different than the first wavelengths, and receiving from a second optical port input light having the first wavelengths and input light having the second wavelengths, said band bi-directional polarization-independent optical isolator comprising:

a bi-directional polarization independent optical element dividing the input light into components and selectively recombining the components into output light transmitted to one of the first optical port and the second optical port and such recombining based upon the plane of polarization of the components and if a change in character of the components has occurred during transmission through the band bi-directional polarization-independent optical isolator;

a mirror/waveplate assembly reflecting therefrom the components of the input light incident on the mirror/waveplate assembly after selectively changing the plane of polarization of the components of the input light incident thereon based upon the wavelength of the components of the input light incident thereon; and at least one lens collimating and directing the components of the input light onto the mirror/waveplate assembly and focusing the reflected components of the input light onto an output port including the one of the first optical port and the second optical port, wherein only input light having the second wavelengths passes through the waveplate portion of the mirror/waveplate assembly.

8. The band bi-directional polarization-independent optical isolator according to claim 7, wherein the band bi-directional polarization-independent optical isolator transmits therethrough the input light including first wavelengths received from the first optical port to the second optical port while preventing transmission therethrough of input light of the first wavelengths received from the second optical port to the first optical port, and transmits therethrough the input light of the second wavelengths received from the second optical port to the first optical port while preventing transmission therethrough of input light of the second wavelengths received from the first optical port to the second optical port.

9. The band bi-directional polarization-independent optical isolator according to claim 7, wherein the bi-directional polarization independent optical element comprises:

a birefringent walk-off plate dividing the input light into the components including an ordinary ray component and an extraordinary ray component and displacing the extraordinary ray component away from the ordinary ray component, and recombining the components reflected by the mirror/waveplate assembly if the ordinary ray component of the input light is changed to an extraordinary ray component of the reflected components and the extraordinary ray component of the input light is changed to an ordinary ray component of the reflected components during transmission through the bi-directional polarization-independent isolator, a reciprocal optical rotator adjacent to the birefringent walk-off plate reciprocally rotating the plane of polarization of the components passing therethrough by 45° in a first direction, and a Faraday rotator, said Faraday rotator adjacent to the birefringent walk-off plate and the reciprocal optical rotator and non-reciprocally rotating the plane of polarization of the components passing therethrough by 45° in the first direction.

10. A band bi-directional polarization-independent optical isolator receiving from a first optical port input light having first wavelengths and input light having second wavelengths different than the first wavelengths, and receiving from a second optical port input light having the first wavelengths and input light having the second wavelengths, said band bi-directional polarization-independent optical isolator comprising:

a bi-directional polarization independent optical element dividing the input light into components and selectively recombining the components into output light transmitted to one of the first optical port and the second optical port and such recombining based upon the plane of polarization of the components and if a change in character of the components has occurred during transmission through the band bi-directional polarization-independent optical isolator;

a mirror/waveplate assembly reflecting therefrom the components of the input light incident on the mirror/waveplate assembly after selectively changing the plane of polarization of the components of the input light incident thereon based upon the wavelength of the components of the input light incident thereon; and at least one lens collimating and directing the components of the input light onto the mirror/waveplate assembly and focusing the reflected components of the input light onto an output port including the one of the first optical port and the second optical port, wherein the mirror/waveplate assembly comprises:

a first reflector reflecting the components of the input light having the first wavelengths, a quarter-wave plate adjacent to the first reflector and rotating the plane of polarization of the components having the second wavelengths and passing therethrough, and a second reflector adjacent to the quarter-wave plate and reflecting the components of the input light having the second wavelengths.

11. The band bi-directional polarization-independent optical isolator according to claim 7, wherein the first wavelengths are included in a first band of wavelengths and the second wavelengths are included in a second band of wavelengths.

12. An interleaved bi-directional polarization-independent optical isolator receiving from a first optical port input light having first wavelengths and input light having second wavelengths different than the first wavelengths, and receiving from a second optical port input light having the first wavelengths and input light having the second wavelengths, said interleaved bi-directional polarization-independent optical isolator comprising:

a bi-directional polarization independent optical element dividing the input light into components and selectively recombining the components into output light transmitted to one of the first optical port and the second optical port and such recombining based upon the plane of polarization of the components and if a change in character of the components has occurred during transmission through the interleaved bi-directional polarization-independent optical isolator;

a non-linear interferometer reflecting therefrom the components of the input light incident on the non-linear interferometer after selectively changing the plane of polarization of the components of the input light incident thereon based upon the wavelength of the components of the input light incident thereon; and at least one lens collimating and directing the components of the input light onto the non-linear interferometer and focusing the reflected components of the input light onto an output port including the one of the first optical port and the second optical port.

13. The interleaved bi-directional polarization-independent optical isolator according to claim 12, wherein the interleaved bi-directional polarization-independent optical isolator transmits therethrough the input light including first wavelengths received from the first optical port to the second optical port while preventing transmission therethrough of input light of the first wavelengths received from the second optical port to the first optical port, and transmits therethrough the input light of the second wavelengths received from the second optical port to the first optical port while preventing transmission therethrough of input light of the second wavelengths received from the first optical port to the second optical port.

14. The interleaved bi-directional polarization-independent optical isolator according to claim 12, wherein the bi-directional polarization independent optical element comprises:

a birefringent walk-off plate dividing the input light into the components including an ordinary ray component and an extraordinary ray component and displacing the extraordinary ray component away from the ordinary ray component, and recombining the components reflected by the non-linear interferometer if the ordinary ray component of the input light is changed to an extraordinary ray component of the reflected components and the extraordinary ray component of the input light is changed to an ordinary ray component of the reflected components during transmission through the bi-directional polarization-independent isolator, a reciprocal optical rotator adjacent to the birefringent walk-off plate reciprocally rotating the plane of polarization of the components passing therethrough by 45° in a first direction, and a Faraday rotator, said Faraday rotator adjacent to the birefringent walk-off plate and the reciprocal optical rotator and non-reciprocally rotating the plane of polarization of the components passing therethrough by 45 in the first direction.

15. The interleaved bi-directional polarization-independent isolator according to claim 12, wherein the input light is divided into first channels including the input light having the first wavelengths, and second channels including the input light having the second wavelengths, and the first and second channels are interleaved with each other.

16. A twin band bi-directional polarization-independent optical isolator comprising:

a four-fiber ferrule including:
a first fiber receiving input light having first wavelengths and outputting output light having second wavelengths different than the first wavelengths and outputting output light having the first wavelengths,
a second fiber corresponding to the first fiber and receiving input light having third wavelengths, and outputting output light having fourth wavelengths different than the third wavelengths and output light having the third wavelengths, a third fiber receiving input light having the second wavelengths and outputting output light having the first wavelengths and outputting output light having the second wavelengths, and
a fourth fiber corresponding to the third fiber and receiving input light having the fourth wavelengths, and outputting output light having the third wavelengths and output light having the fourth wavelengths;

a bi-directional polarization independent optical element adjacent to the four-fiber ferrule and dividing the light input thereto into components and selectively recombining the components into output light transmitted to one of the first fiber, the second fiber, the third fiber, and the fourth fiber, based upon which fiber outputted the input light, the plane of polarization of the components, and if a change in character of the components has occurred during transmission through the twin band bi-directional polarization-independent optical isolator;

a mirror/waveplate assembly reflecting therefrom the components of the input light incident on the mirror/waveplate assembly after selectively changing the plane of polarization of the components of the input light incident thereon based upon the wavelength of the components of the input light incident thereon; and at least one lens collimating and directing the components of the input light onto the mirror/waveplate assembly and focusing the reflected components of the input light onto an output port including one of the first fiber, the second fiber, the third fiber, and the fourth fiber.

17. The twin band bi-directional polarization-independent optical isolator according to claim 16, wherein the mirror/waveplate assembly comprises:

a first reflector reflecting the components of the input light having the first wavelengths and the components of the input light having the third wavelengths, a quarter-wave plate adjacent to the first reflector and rotating the plane of polarization of the components having the second wavelengths and passing therethrough, and rotating the plane of polarization of the components of the input light having the fourth wavelengths and passing therethrough, and a second reflector adjacent to the quarter-wave plate and reflecting the components of the input light having the second wavelengths, and reflecting the components of the input light having the fourth wavelengths.

18. The twin band bi-directional polarization-independent optical isolator according to claim 16, wherein the first wavelengths are included in a first band of wavelengths, the second wavelengths are included in a second band of wavelengths, the third wavelengths are included in a third band of wavelengths, and the fourth wavelengths are included in a fourth band of wavelengths.

19. A twin interleaved bi-directional polarization-independent optical isolator comprising:

a four-fiber ferrule including:
a first fiber receiving input light having first wavelengths and outputting output light having second wavelengths different than the first wavelengths and outputting output light having the first wavelengths,
a second fiber corresponding to the first fiber and receiving input light having third wavelengths, and outputting output light having fourth wavelengths different than the third wavelengths and output light having the third wavelengths,
a third fiber receiving input light having the second wavelengths and outputting output light having the first wavelengths and outputting output light having the second wavelengths, and a fourth fiber corresponding to the third fiber and receiving input light having the fourth wavelengths, and outputting output light having the third wavelengths and output light having the fourth wavelengths;

a bi-directional polarization independent optical element adjacent to the four-fiber ferrule and dividing the light input thereto into components and selectively recombining the components into output light transmitted to one of the first fiber, the second fiber, the third fiber, and the fourth fiber, based upon which fiber outputted the input light, the plane of polarization of the components, and if a change in character of the components has occurred during transmission through the twin interleaved bi-directional polarization-independent optical isolator;

a non-linear interferometer reflecting therefrom the components of the input light incident on the non-linear interferometer after selectively changing the plane of polarization of the components of the input light incident thereon based upon the wavelength of the components of the input light incident thereon; and at least one lens collimating and directing the components of the input light onto the non-linear interferometer and focusing the reflected components of the input light onto an output port including one of the first fiber, the second fiber, the third fiber, and the fourth fiber.

20. The twin interleaved bi-directional polarization-independent isolator according to claim 19, wherein the input light is divided into first channels including the input light having the first wavelengths, second channels including the input light having the second wavelengths, third channels including the input light having the third wavelengths, and fourth channels including the input light having the fourth wavelengths, and wherein the first and second channels are interleaved with each other, and the third and fourth channels are interleaved with each other.

21. A double-stage band bi-directional polarization-independent optical isolator coupled to a polarization-preserving optical coupling and comprising:

a four-fiber ferrule including:

a first fiber receiving input light having first wavelengths and outputting output light having second wavelengths different than the first wavelengths and outputting output light having the first wavelengths, a second fiber receiving input light having the second wavelengths and outputting output light having the first wavelengths, a third fiber corresponding to the second fiber and receiving input light having the second wavelengths and outputting output light having the first wavelengths and output light having the second wavelengths, a fourth fiber corresponding to the first fiber and receiving input light having the first wavelengths, and outputting output light having the second wavelengths, said fourth fiber coupled to the second fiber through the polarization-preserving optical coupling;

a bi-directional polarization independent optical element adjacent to the four-fiber ferrule and dividing the input light into components and selectively recombining the components into output light transmitted to one of the first fiber, the second fiber, the third fiber, and the fourth fiber, and based upon which fiber received the input light, the plane of polarization of the components, and if a change in character of the components has occurred during transmission through the double-stage band bi-directional polarization-independent optical isolator;

a mirror/waveplate assembly reflecting therefrom the components of the input light incident on the mirror/waveplate assembly after selectively changing the plane of polarization of the components of the input light incident thereon based upon the wavelength of the components of the input light incident thereon; and at least one lens positioned equidistantly between the mirror/waveplate assembly and the bi-directional polarization independent optical element and collimating and directing the components of the input light onto the mirror/waveplate assembly and focusing the reflected components of the input light onto the bi-directional polarization independent optical element.

22. The double-stage band bi-directional polarization-independent optical isolator according to claim 21, wherein the mirror/waveplate assembly comprises:

a first reflector reflecting the components of the input light having the first wavelengths, a quarter-wave plate adjacent to the first reflector and rotating the plane of polarization of the components having the second wavelengths and passing therethrough, and a second reflector adjacent to the quarter-wave plate and reflecting the components of the input light having the second wavelengths.

23. The double-stage band bi-directional polarization-independent optical isolator according to claim 21, wherein the first wavelengths are included in a first band of wavelengths and the second wavelengths are included in a second band of wavelengths.

24. A double-stage interleaved bi-directional polarization-independent optical isolator coupled to a polarization-preserving optical coupling and comprising:

a four-fiber ferrule including:

a first fiber receiving input light having first wavelengths and outputting output light having second wavelengths different than the first wavelengths and outputting output light having the first wavelengths, a second fiber receiving input light having the second wavelengths and outputting output light having the first wavelengths, a third fiber corresponding to the second fiber and receiving input light having the second wavelengths and outputting output light having the first wavelengths and output light having the second wavelengths, a fourth fiber corresponding to the first fiber and receiving input light having the first wavelengths, and outputting output light having the second wavelengths, said fourth fiber coupled to the second fiber through the polarization-preserving optical coupling;

a bi-directional polarization independent optical element adjacent to the four-fiber ferrule and dividing the light input thereto into components and selectively recombining the components into output light transmitted to one of the first fiber, the second fiber, the third fiber, and the fourth fiber, and based upon which fiber outputted the input light, the plane of polarization of the components, and if a change in character of the components has occurred during transmission through the band bi-directional polarization-independent optical isolator;

a non-linear interferometer reflecting therefrom the components of the input light incident on the non-linear interferometer after selectively changing the plane of polarization of the components of the input light incident thereon based upon the wavelength of the components of the input light incident thereon; and at least one lens collimating and directing the components of the input light onto the non-linear interferometer and focusing the reflected components of the input light onto an output port including the first fiber, the second fiber, the third fiber, and the fourth fiber.

25. The interleaved bi-directional polarization-independent optical isolator according to claim 24, wherein the input light is divided into first channels including the input light having the first wavelengths and second channels including the input light having the second wavelengths, and wherein the first and second channels are interleaved with each other.

26. A bi-directional polarization-independent isolator comprising:

bi-directional polarization independent optical element means for dividing input light into components and selectively recombining the components based upon the plane of polarization of the components;

reflector means for reflecting therefrom the components of the input light incident on the reflector means after selectively changing the plane of polarization of the components of the input light incident thereon based upon the wavelength of the components of the input light incident thereon; and at least one lens collimating and directing the components of the input light onto the reflector means and focusing the reflected components of the input light onto the bi-directional polarization independent optical element means, wherein the reflector means comprises a mirror/waveplate assembly wherein only input light having the second wavelengths passes through the waveplate portion of the mirror/waveplate assembly.

27. A bi-directional polarization-independent isolator comprising:

bi-directional polarization independent optical element means for dividing input light into components and selectively recombining the components based upon the plane of polarization of the components;

reflector means for reflecting therefrom the components of the input light incident on the reflector means after selectively changing the plane of polarization of the components of the input light incident thereon based upon the wavelength of the components of the input light incident thereon; and at least one lens collimating and directing the components of the input light onto the reflector means and focusing the reflected components of the input light onto the bi-directional polarization independent optical element means, wherein the reflector means comprises a non-linear interferometer.

28. An apparatus comprising:

a bi-directional polarization-independent isolator transmitting therethrough input light including first wavelengths received from a first optical port to a second optical port while preventing transmission therethrough of input light of the first wavelengths received from the second optical port to the first optical port, and, simultaneously, transmitting therethrough input light of second wavelengths different than the first wavelengths and received from the second optical port to the first optical port while preventing transmission therethrough of input light of the second wavelengths received from the first optical port to the second optical port; said bi-directional polarization-independent isolator dividing the input light into components, and recombining the components into output light transmitted to one of the first optical port and the second optical port and such recombining based upon whether the components are changed in character by the bi-directional polarization-independent isolator, wherein the bi-directional polarization-independent isolator comprises:

a bi-directional polarization independent optical element dividing the input light into the components and selectively recombining the components based upon the plane of polarization of the components;

a reflector reflecting therefrom the components of the input light incident on the reflector after selectively changing the plane of polarization of the components of the input light incident thereon based upon the wavelength of the components of the input light incident thereon; and at least one lens collimating and directing the components of the input light onto the reflector and focusing and directing the reflected components of the input light onto an output port including the one of the first optical port and the second optical port, wherein the at least one lens is positioned equidistantly between the reflector and the first and second optical ports.

29. A band bi-directional polarization-independent optical isolator receiving from a first optical port input light having first wavelengths and input light having second wavelengths different than the first wavelengths, and receiving from a second optical port input light having the first wavelengths and input light having the second wavelengths, said band bi-directional polarization-independent optical isolator comprising:

a bi-directional polarization independent optical element dividing the input light into components and selectively recombining the components into output light transmitted to one of the first optical port and the second optical port and such recombining based upon the plane of polarization of the components and if a change in character of the components has occurred during transmission through the band bi-directional polarization-independent optical isolator;

a mirror/waveplate assembly reflecting therefrom the components of the input light incident on the mirror/waveplate assembly after selectively changing the plane of polarization of the components of the input light incident thereon based upon the wavelength of the components of the input light incident thereon; and at least one lens collimating and directing the components of the input light onto the mirror/waveplate assembly and focusing the reflected components of the input light onto an output port including the one of the first optical port and the second optical port, wherein the at least one lens is positioned equidistantly between the mirror/waveplate assembly and the first and second optical ports.

30. The apparatus according to claim 12, wherein the at least one lens is positioned equidistantly between the non-linear interferometer and the first and second optical ports.

31. The apparatus according to claim 16, wherein the at least one lens is positioned equidistantly between the mirror/waveplate assembly and the four-fiber ferrule.

32. The apparatus according to claim 19, wherein the at least one lens is positioned equidistantly between the non-linear interferometer and the four-fiber ferrule.

33. The apparatus according to claim 24, wherein the at least one lens is positioned equidistantly between the non-linear interferometer and the four-fiber ferrule.

34. A bi-directional polarization-independent optical isolator comprising:

bi-directional polarization independent optical element means for dividing input light into components and selectively recombining the components based upon the plane of polarization of the components;

reflector means for reflecting therefrom the components of the input light incident on the reflector means after selectively changing the plane of polarization of the components of the input light incident thereon based upon the wavelength of the components of the input light incident thereon; and at least one lens collimating and directing the components of the input light onto the reflector means and focusing the reflected components of the input light onto the bi-directional polarization independent optical element means, wherein the at least one lens is positioned equidistantly between the reflector means and the bi-directional polarization independent optical element means.

35. The apparatus according to claim 21, wherein the at least one lens is positioned equidistantly between the mirror/waveplate assembly and the bi-directional polarization independent optical element.

36. The apparatus according to claim 6, wherein the reciprocal optical rotator comprises a half-wave plate.

37. The apparatus according to claim 9, wherein the reciprocal optical rotator comprises a half-wave plate.

38. The apparatus according to claim 14, wherein the reciprocal optical rotator comprises a half-wave plate.

* * * * *